(12) United States Patent
Aitken

(10) Patent No.: US 10,545,507 B2
(45) Date of Patent: Jan. 28, 2020

(54) CELLULAR DEVICE LOCATION DISCOVERY SYSTEMS AND METHODS FOR AUTONOMOUS VEHICLES

(71) Applicant: UATC, LLC, San Francisco, CA (US)

(72) Inventor: Michael James Aitken, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 178 days.

(21) Appl. No.: 15/728,911

(22) Filed: Oct. 10, 2017

(65) Prior Publication Data

US 2019/0094884 A1    Mar. 28, 2019

Related U.S. Application Data

(60) Provisional application No. 62/563,697, filed on Sep. 27, 2017.

(51) Int. Cl.
*G05D 1/02* (2006.01)
*H04W 4/04* (2009.01)
*H04L 29/08* (2006.01)
*G05D 1/00* (2006.01)

(52) U.S. Cl.
CPC .......... *G05D 1/0285* (2013.01); *H04W 4/046* (2013.01); *G05D 1/0088* (2013.01); *G05D 2201/0213* (2013.01); *H04L 67/12* (2013.01)

(58) Field of Classification Search
CPC ............... G05D 1/0285; G05D 1/0088; G05D 2201/0213; H04L 67/12; H04L 67/18; H04W 4/46; H04W 4/046
See application file for complete search history.

(56) References Cited

U.S. PATENT DOCUMENTS

| | | | |
|---|---|---|---|
| 9,715,233 B1 * | 7/2017 | Mandeville-Clarke | ...................... H04L 67/20 |
| 9,965,960 B1 * | 5/2018 | McDavitt-Van Fleet | ..................... G06Q 10/00 |
| 10,303,171 B1 * | 5/2019 | Brady | .................. G05D 1/0088 |
| 2015/0339928 A1 * | 11/2015 | Ramanujam | ........... G08G 1/202 701/23 |
| 2018/0033112 A1 * | 2/2018 | Wu | ........................ G06Q 50/30 |

* cited by examiner

*Primary Examiner* — Calvin Cheung
(74) *Attorney, Agent, or Firm* — Dority & Manning, PA

(57) ABSTRACT

Systems and methods for controlling autonomous vehicles are provided. In one example embodiment, a computer-implemented method includes obtaining, by a computing system that includes one or more computing devices onboard an autonomous vehicle, data indicative of an identifier associated with a user device of a user. The identifier can be assigned to the user device by a cellular network. The method includes determining, by the computing system, location data associated with the user device based at least in part on the identifier associated with the user device. The method includes determining, by the computing system, a vehicle route based at least in part on the location data associated with the user device. The method includes causing, by the computing system, the autonomous vehicle to initiate travel in accordance with the vehicle route.

32 Claims, 8 Drawing Sheets

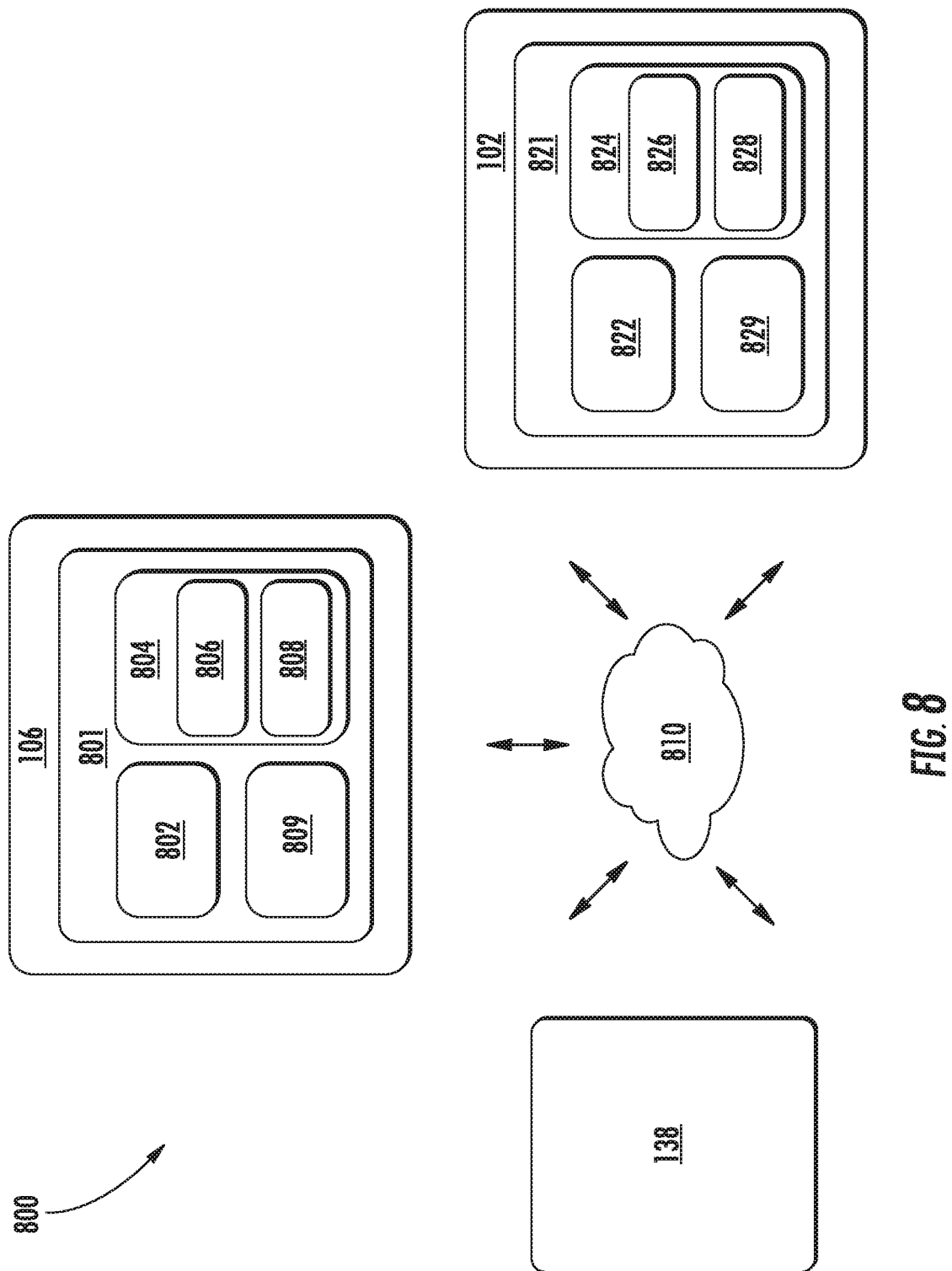

CELLULAR DEVICE LOCATION DISCOVERY SYSTEMS AND METHODS FOR AUTONOMOUS VEHICLES

PRIORITY CLAIM

The present application is based on and claims priority to U.S. Provisional Application 62/563,697 having a filing date of Sep. 27, 2017, which is incorporated by reference herein.

FIELD

The present disclosure relates generally to improving the ability of an autonomous vehicle to locate a user and/or other objects within the surrounding environment of the autonomous vehicle.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of controlling autonomous vehicles. The method includes obtaining, by a computing system that includes one or more computing devices onboard an autonomous vehicle, data indicative of an identifier associated with a user device of a user. In the example, the identifier is assigned to the user device by a cellular network. The method includes determining, by the computing system, location data associated with the user device based at least in part on the identifier associated with the user device. The method includes determining, by the computing system, a vehicle route based at least in part on the location data associated with the user device. The method includes causing, by the computing system, the autonomous vehicle to initiate travel in accordance with the vehicle route.

Another example aspect of the present disclosure is directed to a computing system for controlling autonomous vehicles. The computing system includes one or more processors and one or more memory devices. The one or more memory devices store instructions that when executed by the one or more processors cause the computing system to perform operations. The operations include obtaining data indicative of a service request for a vehicle service for a user. The data indicative of the service request includes data indicative of an identifier associated with a user device. In the example, the identifier is assigned to the user device by a cellular network. The operations include determining location data associated with the user device based at least in part on the identifier associated with the user device. The operations include determining an updated vehicle route based at least in part on the location data associated with the user device. The operations include causing the autonomous vehicle to initiate travel in accordance with the updated vehicle route.

Yet another example aspect of the present disclosure is directed to an autonomous vehicle. The autonomous vehicle includes a communications system including one or more antennas, one or more processors, and one or more memory devices. The one or more memory devices store instructions that when executed by the one or more processors cause the autonomous vehicle to perform operations. The operations include obtaining data indicative of an identifier associated with a user device. In the example, the identifier is assigned to the user device by a cellular network. The operations include obtaining, via the communications system, one or more signals emitted by the user device. The operations include determining location data associated with the user device based at least in part on the identifier associated with the user device and the one or more signals emitted by the user device.

Other example aspects of the present disclosure are directed to systems, methods, vehicles, apparatuses, tangible, non-transitory computer-readable media, and memory devices for predicting object motion and controlling autonomous vehicles with respect to the same.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 8 depicts example system components according to example embodiments of the present disclosure.

DETAILED DESCRIPTION

Figure 1:
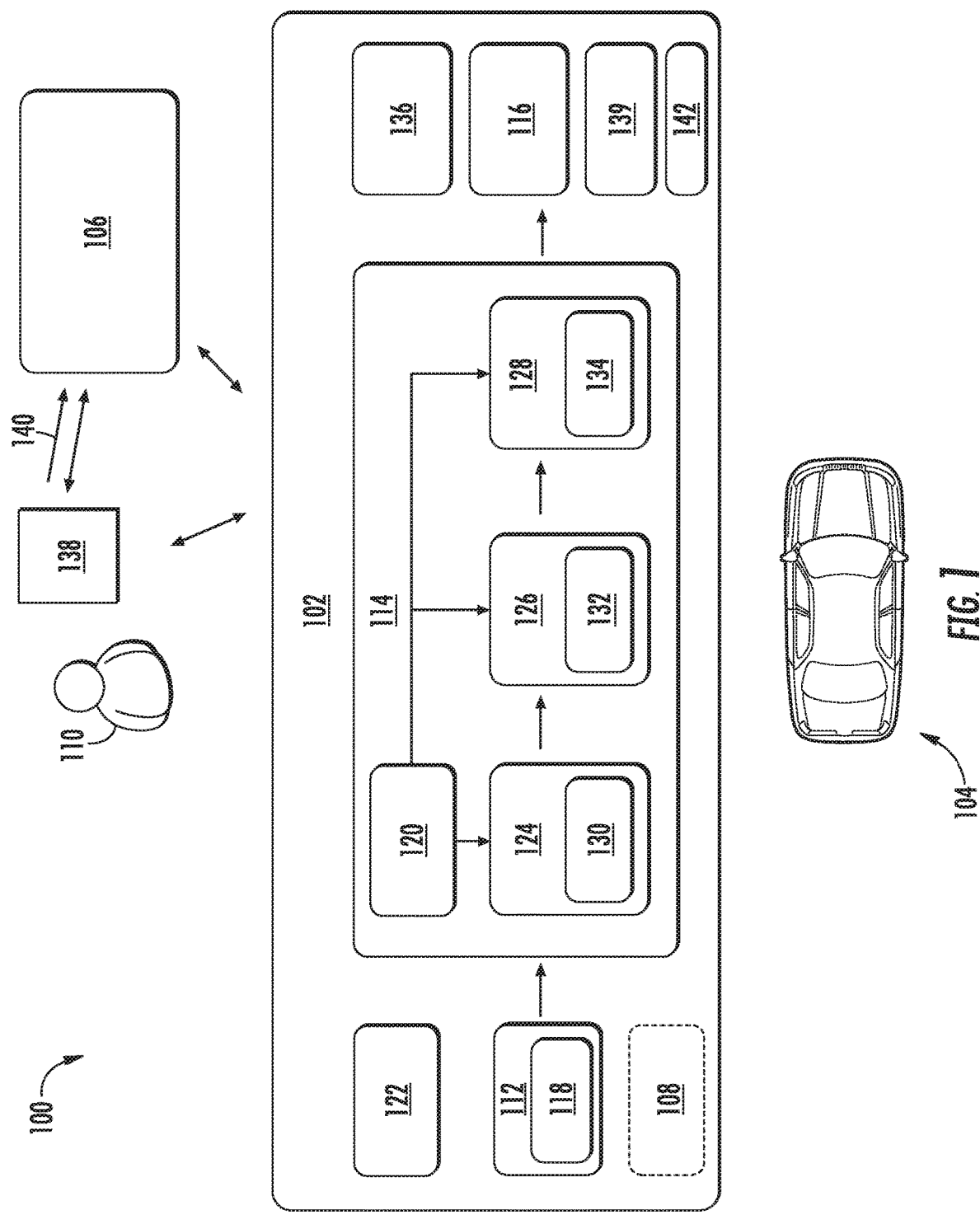
FIG. 1 depicts an example system overview according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improving the ability of an autonomous vehicle to locate a user that desires to utilize the autonomous vehicle and/or other objects within the surrounding environment of the autonomous vehicle. For instance, an entity (e.g., service provider) can use a fleet of vehicles to provide a vehicle service (e.g., transportation service, delivery service, courier service, etc.) to a plurality of users. The fleet can include, for example, a plurality of autonomous vehicles that can drive, navigate, operate, etc. with minimal and/or no interaction from a human driver. A user that the desires to utilize an autonomous vehicle for a vehicle service can send a service request to an operations computing system of the service provider, via a user device (e.g., mobile phone). The user device can be associated with an identifier (e.g., a radio network temporary identifier) that is unique to the user device. The user device can include such identifier in the service request. The operations computing system can process the service request and select an autonomous vehicle that is best suited to provide the vehicle service to the user. The operations computing system can send data associated with the service request to the selected autonomous vehicle. Such data can include the identifier associated with the user device as well as other types of information (e.g., an initial location specified in the service request, a type of vehicle service, time constraints, user preferences, etc.).

The autonomous vehicle can process the data associated with the service request and travel along an initial vehicle route to the user. As the vehicle approaches the user, the autonomous vehicle can utilize the identifier to determine a more accurate, granular location of the user. For example, the autonomous vehicle can scan for signal(s) associated with user device of the user (e.g., radio signals emitted from the user device). The autonomous vehicle can triangulate those signal(s) to determine a refined location of the user device. The autonomous vehicle can update its vehicle route such that the vehicle will arrive at the newly determined, more accurate location of the user. In this way, the autonomous vehicle can more precisely determine the location of a user of the vehicle and improve its vehicle routing to such a user.

More particularly, an entity (e.g., service provider, owner, manager) can use one or more vehicles (e.g., ground-based vehicles) to provide a vehicle service such as a transportation service (e.g., rideshare service), a courier service, a delivery service, etc. The vehicle(s) can be autonomous vehicles that include various systems and devices configured to control the operation of the vehicle. For example, an autonomous vehicle can include an onboard vehicle computing system for operating the vehicle (e.g., located on or within the autonomous vehicle). The vehicle computing system can receive sensor data from sensor(s) located onboard the vehicle (e.g., cameras, a Light Detection and Ranging (LIDAR) system, a Radio Detection and Ranging (RADAR) system), attempt to comprehend the vehicle's surrounding environment by performing various processing techniques on the sensor data, and generate an appropriate motion plan through the vehicle's surrounding environment. Moreover, the autonomous vehicle can include a communications system (e.g., including transmitter(s), receiver(s), antenna(s), etc.) that enables the autonomous vehicle to communicate with and/or otherwise receive signals from devices that are remote from the vehicle. For example, the autonomous vehicle can communicate with the operations computing system, another vehicle, a user device of a user, etc.

A user can create a service request for a vehicle service. For instance, a user can provide a service request to the operations computing system via a user device. The user device can be, for example, a mobile phone, a tablet, a laptop, and/or another type of user device. The user device can be associated with an identifier that is unique, at least temporarily, to the user device. For example, the identifier can be an identifier that is assigned to the user device by a network (e.g., a Long-Term Evolution network, other telecommunication network, etc.) and stored on the user device (e.g., via the radio firmware). The identifier can be a temporary identifier that is associated with the user device (e.g., its radio modem) for a specific time period (e.g., minutes, days, etc.) such as, for example, a radio network temporary identifier (RTNI), other cellular temporary network identifier, and/or other types of identifiers. In some implementations, the identifier can be a permanent identifier that is associated with the user device on a permanent basis.

The user device can provide the identifier to the operations computing system. For instance, the user device can include a software application (e.g., associated with the entity) that is downloaded to a memory of the user device. The user can create the service request via the software application by using, for example, a user interface displayed on the user device when the software application is launched. In some implementations, the user device can acquire the temporary identifier via the software application. By way of example, upon downloading the software application and/or at another time, the user can grant permission for the user device (e.g., radio firmware) to expose the identifier to the operations computing system. In the event that such permission is granted, the user device can provide data indicative of the identifier to the operations computing system. For example, the user device can provide data indicative of a service request for a vehicle service to the operations computing system (e.g., remote from the vehicle). Such data can be indicative of the identifier associated with the user device. The service request can also indicate the type of vehicle service that the user desires (e.g., a transportation service, a delivery service, a courier service, etc.), a location associated with the service request (e.g., a current location of the user, a different location, etc.), and/or other information.

The operations computing system can process the service request and select an autonomous vehicle to provide the requested vehicle service to the user. The operations computing system can provide data indicative of the service request to the autonomous vehicle. This can include data indicative of the identifier associated with the user device. The data indicative of the service request can also be indicative of the type of vehicle service requested, an initial location associated with the user (e.g., an address specified in the service request, GPS coordinate, latitude-longitude pair, etc.), and/or other metadata that may help the autonomous vehicle provide the requested vehicle service to the user.

The autonomous vehicle can obtain the data associated with the service request and route the vehicle to the user. For example, the vehicle computing system can determine an initial vehicle route to the user based at least in part on the initial location specified in the service request. The vehicle computing system can cause the autonomous vehicle to travel (e.g., autonomously) in accordance with the initial vehicle route to the user.

The vehicle computing system can utilize the user device identifier to refine its understanding of the user's location. For instance, the vehicle computing system can obtain data indicative of the identifier associated with the user device of the user (e.g., from the operations computing system, from an accessible memory onboard the vehicle, etc.). The vehicle computing system can determine location data associated with the user device based at least in part on the identifier associated with the user device. The location data can include a location of the user device (e.g., a refined location), a distance between the user device and the autonomous vehicle, a heading of the user device, and/or other information.

To determine the location data, in some implementations, the vehicle computing system can scan for the specific signal(s) associated with the user device of the user that requested the vehicle service. For instance, the user device can emit signal(s) that are indicative of the identifier (e.g., in plain text) on a regular basis. When the autonomous vehicle is within a threshold distance of the user device (e.g., maximum signal travel distance), the vehicle computing system can begin to scan for and obtain one or more signals emitted by the user device that are indicative of the particular identifier associated with the user device. The vehicle computing system can match the identifier from the signal(s) to the identifier that is received from the operations computing system to determine which signals are being emitted from the user device. The vehicle computing system can then triangulate these signals to determine the location data (e.g., location, heading, distance, etc.) associated with these signals, as further described herein.

In some implementations, in order to determine the location data, the vehicle computing system can filter the user device from a plurality of user devices within the surrounding environment of the autonomous vehicle. For instance, the vehicle's communications system can scan for and obtain signal(s) emitted by a plurality of user devices in the surrounding environment of the autonomous vehicle. This can include other user devices associated with pedestrians, other drivers, etc. that are associated with the entity (e.g., associated with the service provider) and/or those that are not associated with the entity. Each of the plurality of signals can include an identifier associated with the respective emitting user device. The vehicle computing system can filter the plurality of signals to identify the user device of the user (e.g., that requested the vehicle service) based on the identifier associated with that user device. For example, the vehicle computing system (e.g., a radio modem) can expose a complete map, result list, etc. of all the identifiers that are discovered within the surrounding environment of the vehicle. The vehicle computing system (e.g., an application layer) can filter out these identifiers to find the unique identifier that matches the identifier associated with the user device (e.g., the identifier provided by the operations computing system).

Once the vehicle computing system has identified the specific signal(s) as being emitted from the user device (e.g., based on the identifier), the vehicle computing system can triangulate these signal(s) to help determine the location data associated with the user device. For instance, the vehicle computing system can measure the parameters of the signal(s) (e.g., signal strength, the time to reception, etc.) with respect to the antenna(s) onboard the autonomous vehicle (e.g., via multiple-input, multiple-output technology of the communications system). The vehicle computing system can triangulate the signal(s) emitted from the user device and can determine the location data (e.g., location, heading, distance, etc.) associated with the user device based at least in part on the triangulation results. In some implementations, the vehicle computing system can perform triangulation to determine the location of a user device based at least in part on a plurality of signals emitted from the user device. For example, the vehicle computing system can receive a plurality of signals emitted from a user device as the autonomous vehicle travels along a previously determined route towards the user. The vehicle computing system can determine the location of the user device based on the plurality of signals. In some implementations, the vehicle computing system can leverage one or more remote antennas (e.g., another autonomous vehicle, cell phone tower, etc.) to triangulate the location of the user device. For example, the vehicle computing system can receive a signal from a remote antenna corresponding to a signal received by an antenna of the autonomous vehicle (e.g., over a wireless network), and the location of the user device can be determined based on the signal(s) received by the respective antennae. For example, the vehicle computing system can transpose the refined location of the user device within the vehicle's perception of its surrounding environment (e.g., into the vehicle's coordinate system associated with the surrounding environment) to enhance its understanding of the user's location. In some implementations, the results of the triangulation of the user device signal(s) can be the sole basis for determining the refined location of the user device. In some implementations, the results of the triangulation can be one of a plurality of inputs that are provided into an algorithm or model (e.g., machine learned model, etc.) that determines the refined location of the user device with the vehicle's surroundings.

The vehicle computing system can determine a vehicle route based at least in part on the location data associated with the user device. For instance, as described herein, the autonomous vehicle can be travelling along an initial vehicle route (e.g., based on an initial location from the service request) when the vehicle computing system begins to scan for the user device signal(s). In some implementations, the vehicle computing system onboard the vehicle can determine an updated vehicle route based at least in part on the location data associated with the user device (e.g., the refined location, heading, etc.). The updated vehicle route can lead to the refined location of the user device (and the user), which was determined based on the identifier.

In some implementations, the updated vehicle route can be determined by a remote computing system that is off-board (e.g., remote from) the autonomous vehicle. For instance, the vehicle computing system can provide the location data associated with the user device to the operations computing system. The operations computing system can be configured to generate a vehicle route that leads to the refined location of the user device. The vehicle computing system can obtain the updated vehicle route from the operations computing system (e.g., via a wireless communication network).

The vehicle computing system can cause the autonomous vehicle to initiate travel along the updated vehicle route. For instance, the vehicle computing system can direct the motion planning system, vehicle control system(s), etc. to adjust the motion of the autonomous vehicle from travelling in accordance with the initial vehicle route to travelling in accordance with the updated vehicle route. As the autonomous vehicle gets closer to the refined location, the vehicle computing system can cause the autonomous vehicle to perform a stopping action proximate to the user (e.g., a pull over action) such that the user can board the vehicle, retrieve an item from the vehicle, place an item in the vehicle, etc.

In some implementations, the vehicle computing system and/or the operations computing system can determine that another autonomous vehicle would be better suited to address the user's service request. For example, the location data may indicate that the user is, in fact, located within a narrow alleyway. The first autonomous vehicle that was assigned to the service request, and determined the refined location data based on the identifier, may be a larger sport utility vehicle that is unable to travel within the alleyway. In such a case, the first autonomous vehicle can provide the location data associated with user device to another, second autonomous vehicle (e.g., a nearby smaller sedan) that is better suited to provide the vehicle service to the user (e.g., capable of picking-up the user in the alleyway). Additionally, or alternatively, the first autonomous vehicle can provide the location data to the operations computing system and the operations computing system can determine that the other, second autonomous vehicle is better suited for the service request. The operations computing system can provide the second autonomous vehicle with the location data and/or a vehicle route to the user (e.g., that is based on the determined location data). The second autonomous vehicle can utilize this location data (e.g., to determine a vehicle route to the user) and/or a vehicle route provided by the operations computing system to travel to the user in order to provide the requested vehicle service.

Refined location data can also be used to improve the vehicle's ability to perceive objects within its surrounding environment. For instance, the vehicle computing system can obtain a plurality of signals associated with a plurality of devices within the surrounding environment of the vehicle. Such devices can include, for example, user devices associated with the entity (e.g., a mobile phone with the entity's software application), computing device(s) of another autonomous vehicle in the entity's fleet, robotic device(s) at a service depot, etc. and/or devices that are not associated with the entity. Additionally, or alternatively, such devices can include signal emitting devices associated with an item (e.g., a package to be retrieved). The autonomous vehicle may have knowledge of identifiers of at least some of the device(s) (e.g., that are associated with the entity) and/or may not have knowledge of identifier(s) of at least some of the device(s) (e.g., that are not associated with the entity). The vehicle computing system can triangulate the signal(s) from the respective devices to determine location data (e.g., location, heading, relative distance, etc.) associated with each respective device. The vehicle computing system can utilize the location data as an additional input into the vehicle's perception system to help identify the objects within the surrounding environment of the autonomous vehicle at a more refined, localized level. Moreover, this can allow for more accurate object motion prediction and vehicle motion planning.

For the purposes of keeping pedestrian safety, the vehicle computing system can recognize that there may be a pedestrian located behind the obstruction, predict the motion of the pedestrian, and plan the vehicle's motion accordingly (e.g., to allow the pedestrian to cross the street). By way of example, the vehicle computing system (e.g., the perception system) may identify a large obstruction (e.g., temporary protective construction wall) within the surrounding environment of the autonomous vehicle (e.g., on a sidewalk). There may also be a pedestrian located behind the obstruction (e.g., walking on the sidewalk behind the wall), but the obstruction is preventing the vehicle's sensors from visualizing the pedestrian (e.g., occluding a sensor field of view). However, the vehicle computing system can identify the location, heading, etc. of a user device of the pedestrian based as least in part on the signals from the user device, as described herein. Moreover, the vehicle computing system can determine that a change in user device location may be indicative of a particular type of moving object, such as a walking pedestrian.

The systems and methods described herein may provide a number of technical effects and benefits. For instance, the systems and methods of the present disclosure improve the ability of the autonomous vehicle to determine the location of a user that has requested a vehicle service. More particularly, the systems and methods allow the autonomous vehicle to, upon permission, leverage a user device identifier (that is not typically exposed) to refine its understanding of the location of that user device within the vehicle's surrounding environment. The refined determination of the user's location can lead to more accurate vehicle routing. Additionally, as described herein, the identification of a user device within the surrounding environment of the autonomous vehicle can improve the ability of the vehicle to perceive objects within the vehicle's surroundings. This can ultimately lead to more accurate object motion prediction, autonomous vehicle motion planning, etc. For example, this increased understanding of the location of objects within the surrounding environment can improve the logistical navigation of the autonomous vehicle (e.g., to navigate around objects, yield for objects, arrive at a particular robotic system in a service depot, etc.). The refined vehicle routing and logistical navigation can improve the convenience and safety of the users of the vehicle and the objects within the vehicle's surroundings.

The systems and methods of the present disclosure also provide an improvement to vehicle computing technology, such as autonomous vehicle computing technology. For instance, the computer-implemented methods and systems provide the vehicle with a more accurate user-location detection capability. The systems and methods can enable a computing system (e.g., of an autonomous vehicle) to obtain data indicative of an identifier associated with a user device of a user (e.g., a temporary identifier assigned by a telecommunications network). The computing system can determine location data associated with the user device based at least in part on the identifier associated with the user device of the user. The computing system can determine a vehicle route (e.g., an updated vehicle route) based at least in part on the location data associated with the user device. The computing system can cause the autonomous vehicle to initiate travel in accordance with the vehicle route. Accordingly, the systems and methods can help solve, at least, the technical problem of how to provide the vehicle with the capability to obtain a more granular understanding of the user's location within the vehicle's environment. For instance, the systems and methods can enable the autonomous vehicle to leverage an identifier associated with the user device (e.g., assigned by a cellular network) to accurately determine and transpose the location of the user device within the vehicle's localized understanding of its environment. As such, the vehicle computing system can save valuable computational resources (e.g., data storage, processing, battery power, etc.) and other resources (e.g., fuel, etc.) that would be spent by the vehicle performing multiple pull-over maneuvers as it attempts to arrive at a convenient location for the user. Additionally, the systems and methods of the present disclosure can enable a vehicle to more accurately and efficiently locate a user that has changed positions (e.g., from the initial location specified in the service request). For example, the vehicle computing system can locate the user based on the identifier rather than having to communicate directly with the user (e.g., via a text message, voice call, etc.) to obtain an updated location. This can help save the time needed to locate a user as well as valuable communication resources (e.g., bandwidth, etc.).

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104.

The vehicle 104 incorporating the vehicle computing system 102 can be a ground-based autonomous vehicle (e.g., car, truck, bus, etc.), an air-based autonomous vehicle (e.g., airplane, drone, helicopter, or other aircraft), or other types of vehicles (e.g., watercraft, etc.). The vehicle 104 can be an autonomous vehicle that can drive, navigate, operate, etc. with minimal and/or no interaction from a human driver. A human operator can be omitted from the vehicle 104 (and/or also omitted from remote control of the vehicle 104).

The vehicle 104 can be configured to operate in a plurality of operating modes 108. The vehicle 104 can be configured to operate in a fully autonomous (e.g., self-driving) operating mode in which the vehicle 104 can drive and navigate with no input from a user present in the vehicle 104. The vehicle 104 can be configured to operate in a semi-autonomous operating mode in which the vehicle 104 can operate with some input from a user present in the vehicle 104. The vehicle 104 can enter into a manual operating mode in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode to help assist the operator of the vehicle 104.

The operating mode 108 of the vehicle 104 can be adjusted in a variety of manners. In some implementations, the operating mode 108 of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode 108. By way of example, the operations computing system 106 can send one or more control signals to the vehicle 104 instructing the vehicle 104 to enter into the fully autonomous operating mode. In some implementations, the operating mode 108 of the vehicle 104 can be set onboard and/or near the vehicle 104. For example, the vehicle computing system 102 can automatically determine when and where the vehicle 104 is to enter, change, maintain, etc. a particular operating mode 108 (e.g., without user input). Additionally, or alternatively, the operating mode 108 of the vehicle 104 can be manually selected via one or more interfaces located onboard the vehicle 104 (e.g., key switch, button, etc.) and/or associated with a computing device proximate to the vehicle 104 (e.g., a tablet operated by authorized personnel located near the vehicle 104). In some implementations, the operating mode 108 of the vehicle 104 can be adjusted based at least in part on a sequence of interfaces located on the vehicle 104. For example, the operating mode 108 may be adjusted by manipulating a series of interfaces in a particular order to cause the vehicle 104 to enter into a particular operating mode 108.

The vehicle computing system 102 can include one or more computing devices located onboard the vehicle 104. For example, the computing device(s) can be located on and/or within the vehicle 104. The computing device(s) can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the vehicle 104 (e.g., its computing system, one or more processors, etc.) to perform operations and functions, such as those described herein for determining user device location data and controlling the vehicle 104 with regards to the same.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, to the side of the vehicle 104, etc. The sensor data 118 can be indicative of locations associated with the object(s) within the surrounding environment of the vehicle 104 at one or more times. For example, sensor data 118 can be indicative of LIDAR point cloud(s) associated with the object(s) within the surrounding environment. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors, a satellite positioning system, based on IP/MAC address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to one or more remote computing device(s) (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment (e.g., transpose the vehicle's position within its surrounding environment).

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current and/or past state of an object that is proximate to the vehicle 104. The state data 130 for each object can describe, for example, an estimate of the object's current and/or past: location (also referred to as position); speed (also referred to as velocity); acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, other actions, etc. of the vehicle 104.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller configured to translate the motion plan 134 into instructions. By way of example, the mobility controller can translate a determined motion plan 134 into instructions to adjust the steering of the vehicle 104 "X" degrees, apply a certain magnitude of braking force, etc. The mobility controller can send one or more control signals to the responsible vehicle control component (e.g., braking control system, steering control system, acceleration control system) to execute the instructions and implement the motion plan 134.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can also be configured to enable the autonomous vehicle to communicate with and/or provide and/or receive data/signal(s) from a user device 138 associated with a user 110 and/or an item (e.g., an item to be picked-up for a courier service). The communications system 136 can utilize various communication technologies such as, for example, radio frequency signaling, Bluetooth low energy protocol, etc. The communications system 136 can include any suitable components for interfacing with one or more network(s), including, for example, one or more: transmitters, receivers, ports, controllers, antennas, and/or other suitable components that can help facilitate communication. The communications system 136 can include a plurality of components (e.g., antennas, etc.) that allow it to implement and utilize multiple-input, multiple-output (MIMO) technology and communication techniques.

The vehicle 104 can include one or more human-machine interfaces 139. For example, the vehicle 104 can include one or more display devices located onboard the vehicle 104. A display device (e.g., screen of a tablet, laptop, etc.) can be viewable by a user of the vehicle 104 that is located in the front of the vehicle 104 (e.g., driver's seat, front passenger seat). Additionally, or alternatively, a display device can be viewable by a user of the vehicle 104 that is located in the rear of the vehicle 104 (e.g., back passenger seat(s)).

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity. The vehicle 104 can be configured to provide one or more vehicle services to one or more users. The vehicle service(s) can include transportation services (e.g., rideshare services in which the user rides in the vehicle 104 to be transported), courier services, delivery services, and/or other types of services. The vehicle service(s) can be offered to users by the entity, for example, via a software application (e.g., a mobile phone software application). The entity can utilize the operations computing system 106 to coordinate and/or manage the vehicle 104 (and its associated fleet, if any) to provide the vehicle services to a user 110.

The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device(s) can include one or more processor(s) and one or more tangible, non-transitory, computer readable media (e.g., memory devices). The one or more tangible, non-transitory, computer readable media can store instructions that when executed by the one or more processor(s) cause the operations computing system 106 (e.g., the one or more processors, etc.) to perform operations and functions, such as coordinating vehicles to provide vehicle services.

For example, a user 110 can request a vehicle service. For instance, the user 110 can create a service request 140 for a vehicle service via a user device 138 (e.g., a mobile phone, a tablet, a laptop, etc.). The user device 138 can provide data indicative of a service request 140 to the operations computing system 106 (e.g., of the entity that is associated with the vehicle 104). In some implementations, the service request 140 can be generated based at least in part on user input to a user interface displayed via a display device of the user device 138 (e.g., a user interface associated with a software application of the entity). The service request 140 can indicate the type of vehicle service that the user 110 desires (e.g., a transportation service, a delivery service, a courier service, etc.), an initial location associated with the user 110 (e.g., a current location of the user, a different location, etc.), a destination location, user preferences/settings, and/or other information.

Figure 2:
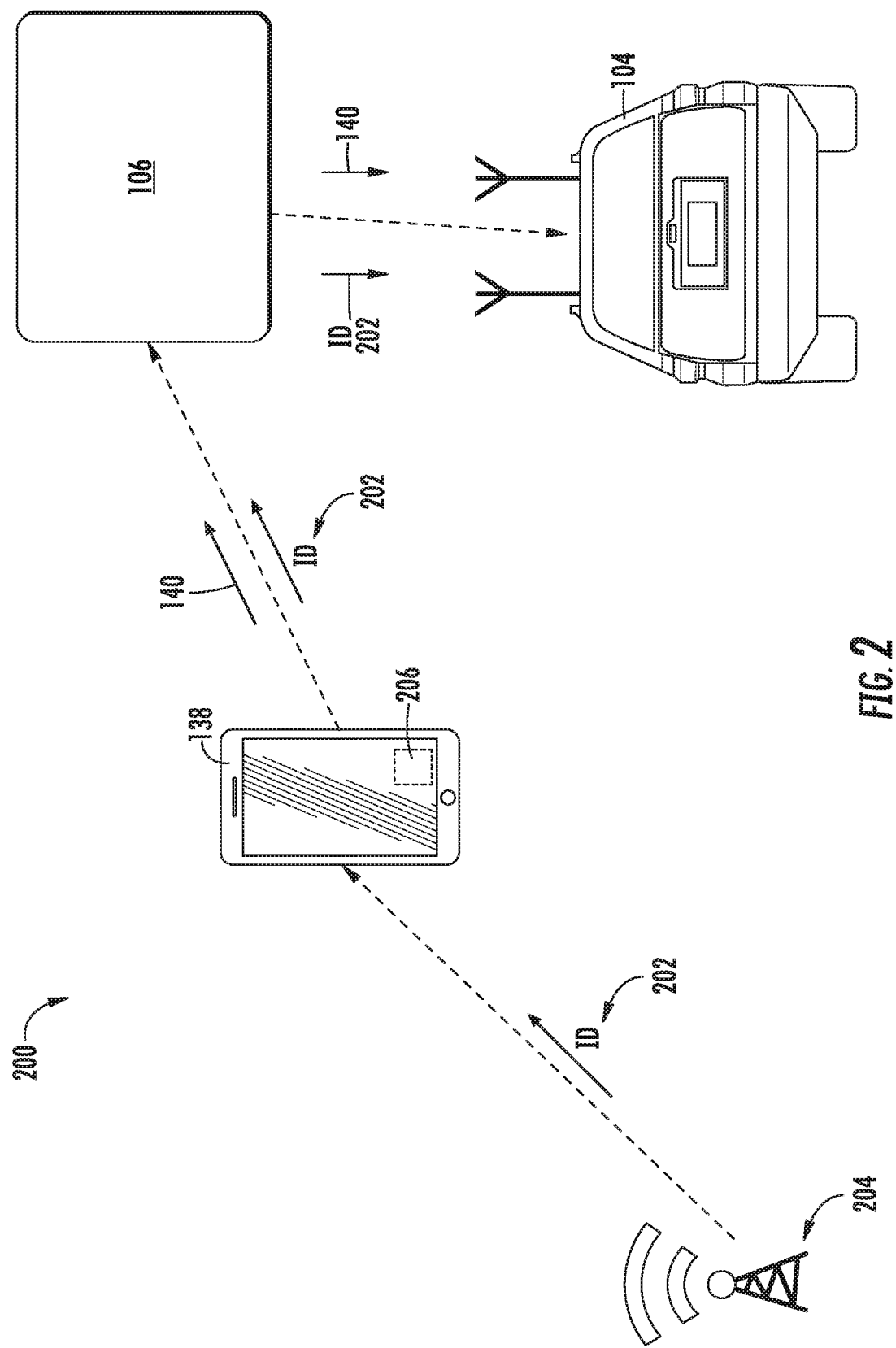
FIG. 2 depicts an example communications according to example embodiments of the present disclosure.

The user device 138 can be associated with an identifier that is unique, at least temporarily, to the user device 138. For example, FIG. 2 depicts an example diagram 200 illustrating communications including an identifier 202 according to example embodiments of the present disclosure. The identifier 202 can be an identifier that is assigned to the user device 138 by a telecommunications network (e.g., a Long-Term Evolution network, other telecommunication network, etc.) and/or stored on the user device 138 (e.g., via the radio firmware). For example, the data indicative of the identifier 202 can be provided to the user device 138 by a network device 204 (e.g., base station, cell tower, etc.). The identifier 202 can be a temporary identifier that is associated with the user device 138 (e.g., its radio modem) for a specific time period (e.g., minutes, days, etc.) such as, for example, a radio network temporary identifier (RTNI) associated with the user device 138, other cellular temporary network identifier, and/or other types of identifiers. In some implementations, the identifier 202 can be a permanent identifier that is associated with the user device 138 on a permanent basis.

The user device 138 can provide the identifier 202 to the operations computing system. For instance, the user device 138 can include a software application 206 (e.g., associated with the entity) that is downloaded to a memory of the user device 138. The user 110 can create the service request 140 via the software application 206 by using, for example, a user interface displayed on the user device 138 (e.g., a display device associated therewith) when the software application 206 is launched. In some implementations, the user device 138 can acquire the identifier 202 (e.g., temporary identifier) via the software application 206. By way of example, upon downloading the software application 206 and/or at another time, the user 110 can grant permission for the user device 138 (e.g., radio firmware) to expose the identifier 202 to the operations computing system 106.

The user device 138 can provide data indicative of the identifier 202 to the operations computing system 106. This can be similar to, the same as, or different from the data indicative of the identifier provided by the network device 204 to the user device 138. For example, the user device 138 can provide data indicative of a service request 140 for a vehicle service to the operations computing system 106 (e.g., remote from the vehicle). In some implementations, the data indicative of a service request 140 can also be indicative of the identifier 202 associated with the user device 138. Additionally, or alternatively, the data indicative of a service request 140 can be sent in the same data packet as the data indicative of the identifier 202 associated with the user device 138. In some implementations, data indicative of a service request 140 can be sent separately from the data indicative of the identifier 202 associated with the user device 138. In such implementations, the service request 140 can be associated with the data indicative of the identifier 202 such that the operations computing system 106 can recognize a relationship between them. As described herein, the data indicative of the service request 140 can also indicate other types of information such as, for example, the type of vehicle service that the user desires (e.g., a transportation service, a delivery service, a courier service, etc.), an initial location associated with the service request (e.g., a current location of the user 110, a different location, etc.), and/or other information.

In some implementations, a different user device can make the service request than the user device to be located by the vehicle computing system 102. For example, the user 110 can make a service request via a first user device to for a courier service of an item. The service request can include an identifier associated with a second user device. The second user device can be, for example, a signal emitting device associated with an item (e.g., a beacon emitting a signal indicative of the identifier). The vehicle 104 can utilize the systems and methods described herein to locate the item.

The operations computing system 106 can process the service request 140 and select a vehicle 104 to provide the requested vehicle service to the user 110. The operations computing system 106 can provide data indicative of the service request 140 to the vehicle 104. The data indicative of the service request 140 can include data indicative of an identifier 202 associated with the user device 138. In some implementations, data indicative of an identifier 202 can be sent separately. In such implementations, the data can include information that can allow the vehicle 104 to recognize that the identifier 202 associated with the user device 138 is associated with the service request 140. The data indicative of the service request 140 can also be indicative of the type of vehicle service requested, an initial location associated with the user 110 (e.g., an address specified in the service request, GPS coordinate, latitude-longitude pair, etc.), and/or other metadata that may help the vehicle 104 provide the requested vehicle service(s) to the user 110.

Figure 3:
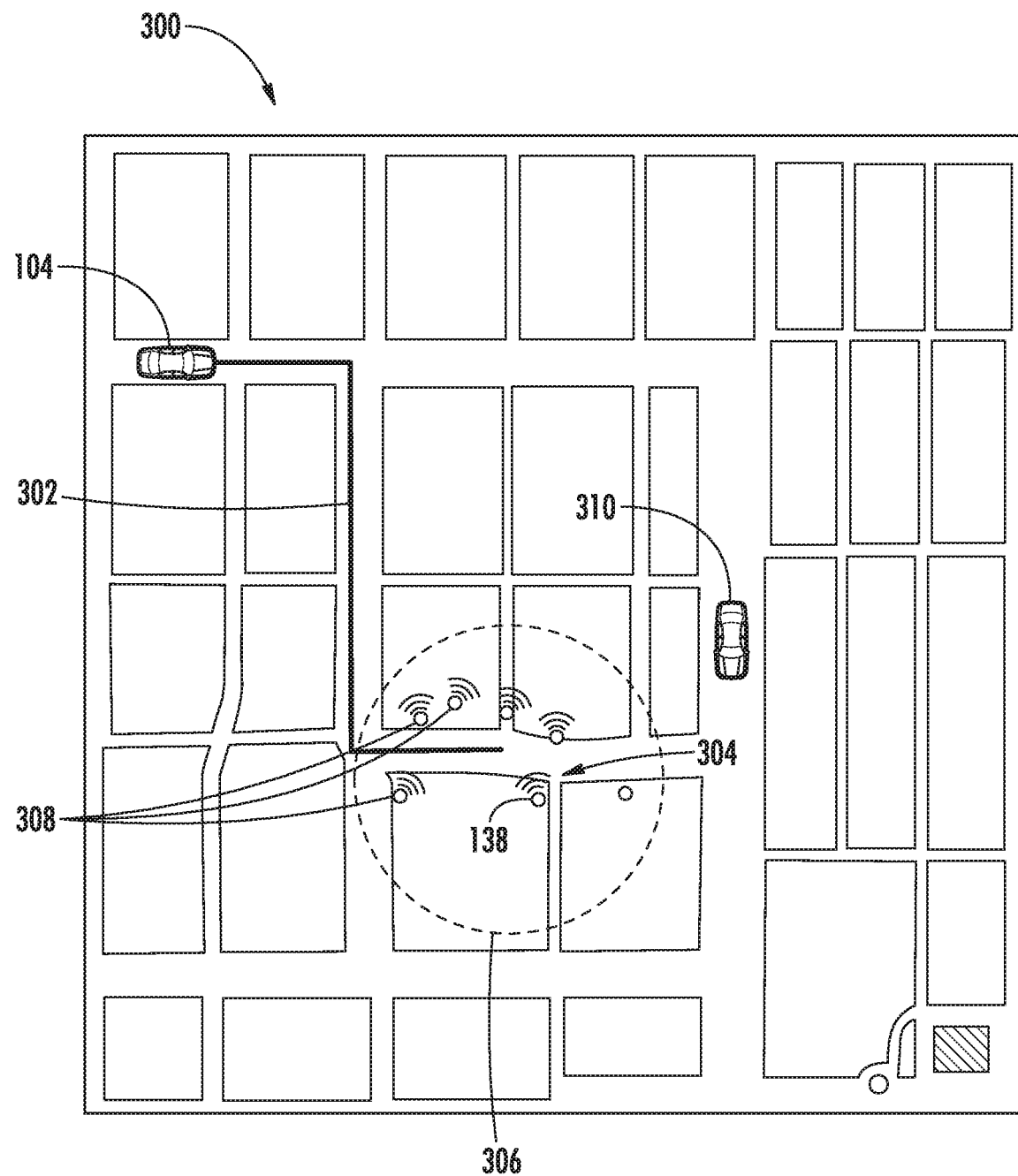
FIG. 3 depicts an example geographic area in which a vehicle is travelling according to example embodiments of the present disclosure.

The vehicle computing system 102 can obtain the data indicative of the service request 140 for the vehicle service for the user 110. The vehicle computing system 102 can travel within a geographic area to provide the vehicle service to the user 110. For example, FIG. 3 depicts an example geographic area 300 in which the vehicle 104 (e.g., a first vehicle) is travelling according to example embodiments of the present disclosure. The vehicle computing system 102 can travel in accordance with an initial vehicle route 302 that leads to the user 110 (e.g., the user device 138) based at least in part on, for example, an initial location specified in the service request 140. The initial vehicle route 302 can be, for example, a route from a current location and/or starting location of the vehicle 104 to the initial location associated with the user 110. In some implementations, the operations computing system 106 can provide the initial vehicle route 302 to the vehicle 104. Additionally, or alternatively, the vehicle computing system 102 of the vehicle 104 can determine the initial vehicle route 302. For example, the vehicle computing system 102 can determine the initial vehicle route 302 based at least in part on the map data 12, the specified initial location, and/or other information. The vehicle computing system 102 can cause the vehicle 104 to travel (e.g., autonomously) in accordance with the initial vehicle route 302 (e.g., using the autonomy system 114 and control system 116 functions described herein).

The vehicle computing system 102 can utilize the identifier 202 associated with the user device 138 to refine its understanding of the user's location. For instance, the vehicle computing system 102 can obtain data indicative of the identifier 202 associated with the user device 138 of the user 110 (e.g., from the operations computing system 106, from an accessible memory onboard the vehicle 104, etc.). The vehicle computing system 102 can provide the identifier 202 to a modem firmware function that can pick out the particular identifier associated with the user device 138 (e.g., temporary identifier). The vehicle computing system 102 can determine location data 142 (shown in FIG. 1) associated with the user device 138 based at least in part on the identifier 202 associated with the user device 138, as further described herein. The location data 142 can include a location of the user device 138 (e.g., a refined location), a distance between the user device 138 and the vehicle 104, a heading of the user device 138, and/or other information.

In some implementations, in order to determine the location data 142, the vehicle computing system 102 can scan for specific signal(s) associated with the user device 138 of the user 110 that requested the vehicle service. The user device 138 can emit signal(s) 304 that are indicative of the identifier 202 (e.g., in plain text) on a regular, periodic, etc. basis. The vehicle 104 can be and/or arrive within a threshold distance 306 from the user device 138. The threshold distance 306 can represent, for example, the maximum distance at which the vehicle's communications system 136 can obtain signal(s) 304 that indicate the identifier 202 associated with the user device 138. The vehicle computing system 102 can begin to scan for the signal(s) 304 emitted from the user device 138 (e.g., located within a surrounding environment of the vehicle 104). The vehicle computing system 102 can obtain (e.g., via the communications system 136) one or more signals 304 emitted by the user device 138 (e.g., the one or more signals 304 indicative of the identifier 202 associated with the user device 138).

The vehicle computing system 102 can determine the location data 142 associated with the user device 138 based at least in part on the identifier 202 associated with the user device 138 and the one or more signals 304 emitted by the user device 138. For instance, the vehicle computing system 102 can identify the one or more signals 304 as being emitted from the user device 138 based at least in part on the identifier 202. By way of example, the vehicle computing system 102 can match the identifier from the signal(s) 304 to the identifier 202 that is obtained from the operations computing system 106 to determine which signal(s) 304 are being emitted from the user device 138. The vehicle computing system 102 can perform a triangulation of the one or more signals 304 emitted from the user device and determine the location data 142 associated with the user device 138 based at least in part on the triangulation of the one or more signals 304 (e.g., emitted from the user device 138), as further described herein.

In some implementations, in order to determine the location data 142, the vehicle computing system 102 can filter the user device 138 from a plurality of other user devices within the surrounding environment of the vehicle 104. For instance, the vehicle computing system 102 can obtain (e.g., via the communications systems 136) a plurality of signals emitted from a plurality of user devices 308 located within a surrounding environment of the vehicle 104. The plurality of user devices 308 can include other user devices associated with pedestrians, other drivers, etc. that are associated with the entity (e.g., associated with the service provider) and/or those that are not associated with the entity. The plurality of user devices 308 may include the user device 138. The plurality of user devices 308 can include user devices for which the entity has been granted permission to obtain an identifier. In some implementations, the plurality of user devices 308 can include user devices for which the entity has not been granted permission to obtain an identifier (e.g., and thus cannot specifically identified the specific user device). Each of the plurality of signals can include an identifier associated with the respective emitting user device. The vehicle computing system 102 can filter the plurality of signals to identify the user device 138 of the user 138 (e.g., that requested the vehicle service) based on the identifier 202 associated with that user device 138. For example, the vehicle computing system 102 (e.g., a radio modem) can expose a complete map, result list, etc. of all the identifiers that are discovered within the surrounding environment of the vehicle 104. The vehicle computing system 102 (e.g., an application layer) can filter out these identifiers to find the unique identifier that matches the identifier 202 associated with the user device 138 (e.g., the identifier 202 provided by the operations computing system 106). In this way, the user device 138 can be identified from among a plurality of other user devices within the surrounding environment of the vehicle 104.

The vehicle computing system 102 can determine the location data 142 associated with the user device 138 based at least in part on a triangulation of the one or more signals 304 emitted by the user device 138. For instance, the vehicle computing system 102 can measure the parameters of the signal(s) 304 (e.g., signal strength, the time to reception, etc.) with respect to the antenna(s) onboard the vehicle 104 (e.g., via MIMO technology of the communications system 136). The vehicle computing system 102 can triangulate the signal(s) 304 emitted from the user device 138 and can determine the location data (e.g., location, heading, distance, etc.) associated with the user device 138 based at least in part on the triangulation results. For instance, the vehicle computing system 138 can perform triangulation to determine the location of a user device 138 based at least in part on a plurality of signals emitted from the user device 138. For example, the vehicle computing system 102 can receive a plurality of signals 304 emitted from a user device 138 as the vehicle 104 travels along a previously determined route towards the user 110 (e.g., along an initial vehicle route). The vehicle computing system 102 can determine the location of the user device 138 based on the plurality of signals 304 (e.g., detected while the vehicle 104 is moving). In some implementations, the vehicle computing system 102 can leverage one or more remote antennas (e.g., another vehicle, cell phone tower, etc.) to triangulate the location of the user device 138. For example, the vehicle computing system 102 can receive a signal from a remote antenna corresponding to a signal received by an antenna of the vehicle 104 (e.g., over a wireless network). The location of the user device 138 can be determined based on the signal(s) received by the respective antennae. For example, the vehicle computing system 102 can transpose the refined location of the user device 138 within the vehicle's perception of its surrounding environment (e.g., into the vehicle's coordinate system associated with the surrounding environment) to enhance its understanding of the user's location. In some implementations, the results of the triangulation of the one or more signals 304 can be the sole basis for determining the refined location of the user device 138. In some implementations, the results of the triangulation can be one of a plurality of inputs that are provided into an algorithm or model (e.g., machine learned model, etc.) that determines the refined location of the user device 138 within the surrounding environment of the vehicle 104.

Figure 4:
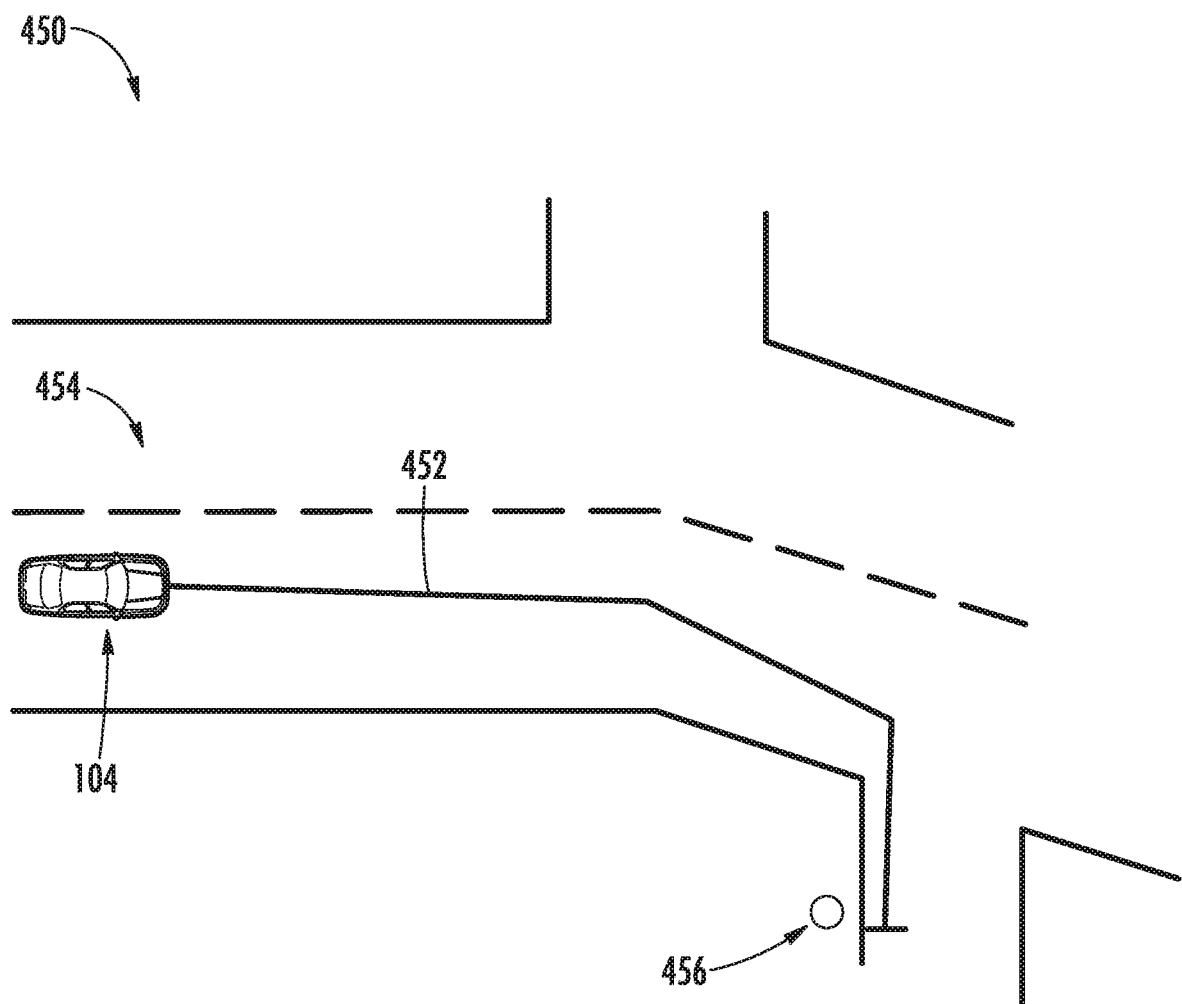
FIG. 4 depicts a zoomed-in view of a portion of the example geographic area of FIG. 3 according to example embodiments of the present disclosure.

FIG. 4 depicts a zoomed-in view of a portion 450 of the example geographic area 400 of FIG. 3 according to example embodiments of the present disclosure. The vehicle computing system 102 can determine a vehicle route such as, for example, an updated vehicle route 452 based at least in part on the location data 142 associated with the user device 138. For instance, as described herein, the vehicle 104 can be travelling in accordance with an initial vehicle route 302 (e.g., based on an initial location from the service request 140) when the vehicle computing system 102 (e.g., the communications system 136) begins to scan for the signal(s) 304 emitted by the user device 138 (e.g., emitted by one or more user device antenna(s), etc.). In some implementations, while travelling along the initial vehicle route 302, the vehicle computing system 102 onboard the vehicle 102 can determine an updated vehicle route 452 based at least in part on the location data 142 associated with the user device 138 (e.g., the refined location, heading, etc.). The updated vehicle route 452 can lead to the refined location of the user device 138 (and the user 110), which was determined based at least in part on the identifier 202.

In some implementations, the updated vehicle route 452 can be determined by a remote computing system that is off-board (e.g., remote from) the vehicle 104. For instance, the vehicle computing system 102 can provide the location data 142 associated with the user device 138 to the operations computing system 106. The operations computing system 106 can be configured to generate a vehicle route (e.g., an updated vehicle route 452) that leads to the refined location of the user device 138 (e.g., as determined using the identifier 202). The vehicle computing system 102 can obtain data indicative of the updated vehicle route 452 from the operations computing system 106 (e.g., via a wireless communication network).

The vehicle computing system 102 can cause the vehicle 104 to initiate travel in accordance with the updated vehicle route 452. For instance, the vehicle computing system 102 can cause the vehicle 104 to adjust a motion of the vehicle 104 from travelling in accordance with the initial vehicle route 302 to travelling in accordance with the updated vehicle route 452. To do so, the motion planning system 128, the vehicle control system(s) 116, etc. can adjust the motion of the vehicle 104 from travelling in accordance with the initial vehicle route 302 to travelling in accordance with the updated vehicle route 452 along one or more travel way(s) 454 (e.g., roads). As the vehicle 104 moves closer to the location 456 of the user device 138/user 110 (e.g., the refined location determined using the identifier 202), the vehicle computing system 102 can cause the vehicle 102 to perform a stopping action proximate to the location 456 of the user device 138/user 110 (e.g., a pull over action within close walking distance of the user). In this way, the vehicle 104 can improve its ability to arrive nearby the user 110 such that the user 110 can board the vehicle 104, retrieve an item from the vehicle 104, place an item in the vehicle 104, and/or perform any other user action to begin the requested vehicle service.

Returning to FIG. 3, in some implementations, the vehicle computing system 102 and/or the operations computing system 106 can determine that another vehicle 310 would be better suited to address the user's service request 140. The vehicle computing system 102 can provide the location data 142 (e.g., determined based at least in part on the identifier 202 and/or the signal(s) 304) to at least one of remote computing system that is remote from the vehicle 104 (e.g., the operations computing system 106) and/or another vehicle 310. In some implementations, the remote computing system can select another vehicle 310 to travel to the location of the user 110 (e.g., the location of the user device 138 determined by the identifier 202). Additionally, or alternatively, the other vehicle 310 can receive the location data 142 and route itself to the location of the user 110 (e.g., the location of the user device 138 determined by the identifier 202).

By way of example, the location data 142 may indicate that the user 110 is located within a narrow alleyway. The vehicle 104 (e.g., a first vehicle) that was assigned to the service request, and determined the location data 142 based at least in part on the identifier 202, may be a larger sport utility vehicle that is unable to travel within the alleyway. In such a case, the vehicle 104 can provide the location data 142 associated with user device 138 to another, second vehicle 310 (e.g., a nearby smaller sedan) that is better suited to provide the vehicle service to the user 110 (e.g., capable of picking-up the user 110 in the alleyway). The second vehicle 310 can utilize the location data 142 to determine a vehicle route to the user device 138/user 110 and to travel to the user 110 in order to provide the requested vehicle service. Additionally, or alternatively, the vehicle 104 can provide the location data 142 to the operations computing system 106. The operations computing system 106 can determine that the other, second vehicle 310 is better suited for the service request 140. The operations computing system 106 can provide the second vehicle 310 with the location data 142 and/or a vehicle route to the user device 138/user 110 that is based at least in part on the determined location data 142. The second vehicle 310 can utilize the location data 142 and/or the vehicle route provided by the operations computing system 106 to travel to the user 110. Accordingly, the refined location data (e.g., found using the identifier 202) can be leveraged by a plurality of vehicles (e.g., in a fleet), without having to repeat the device locating procedures described herein. This can lead to a conservation of the second vehicle's computational resources (e.g., processors, memory, bandwidth, etc.) such that these resources can be used for other vehicle functions.

In some implementations, the location data 142 (e.g., determined using the identifier 202) can be used to improve a vehicle's ability to perceive objects within its surrounding environment. For instance, the vehicle computing system 102 can obtain a plurality of signals emitted from a plurality of devices located within a surrounding environment of the vehicle 104. Such devices can include, for example, user devices associated with the entity (e.g., a mobile phone with the entity's software application downloaded thereto), computing device(s) of another vehicle in the entity's fleet, robotic device(s) at a service depot (e.g., automatic cleaning/maintenance systems within the interior of the service depot), etc. and/or devices that are not associated with the entity. Each of the plurality of signals can include an identifier associated with the respective emitting user device. The vehicle computing system 102 may have knowledge of identifiers of at least some of the device(s) (e.g., that are associated with the entity) and/or may not have knowledge of identifier(s) of at least some of the device(s) (e.g., that are not associated with the entity). The vehicle computing system 102 can determine location data associated with each of the plurality of user devices within the surrounding environment of the vehicle 104 based at least in part on the identifier associated with the respective user device (if any) and/or the signals emitted by the device. For instance, the vehicle computing system 102 can triangulate the signal(s) from the respective devices to determine location data (e.g., location, heading, relative distance, etc.) associated with each respective device. The vehicle computing system 102 can perceive one or more objects within the surrounding environment of the vehicle 104 based at least in part on the location data associated with one or more of the plurality of user devices. For instance, the vehicle computing system 102 can utilize this location data as additional input(s) into the perception system 124 to help identify the objects within the surrounding environment of the vehicle 104 (and associated state data 130) at a more refined, localized level. Moreover, this can allow for more accurate object motion prediction and vehicle motion planning.

Figure 5:
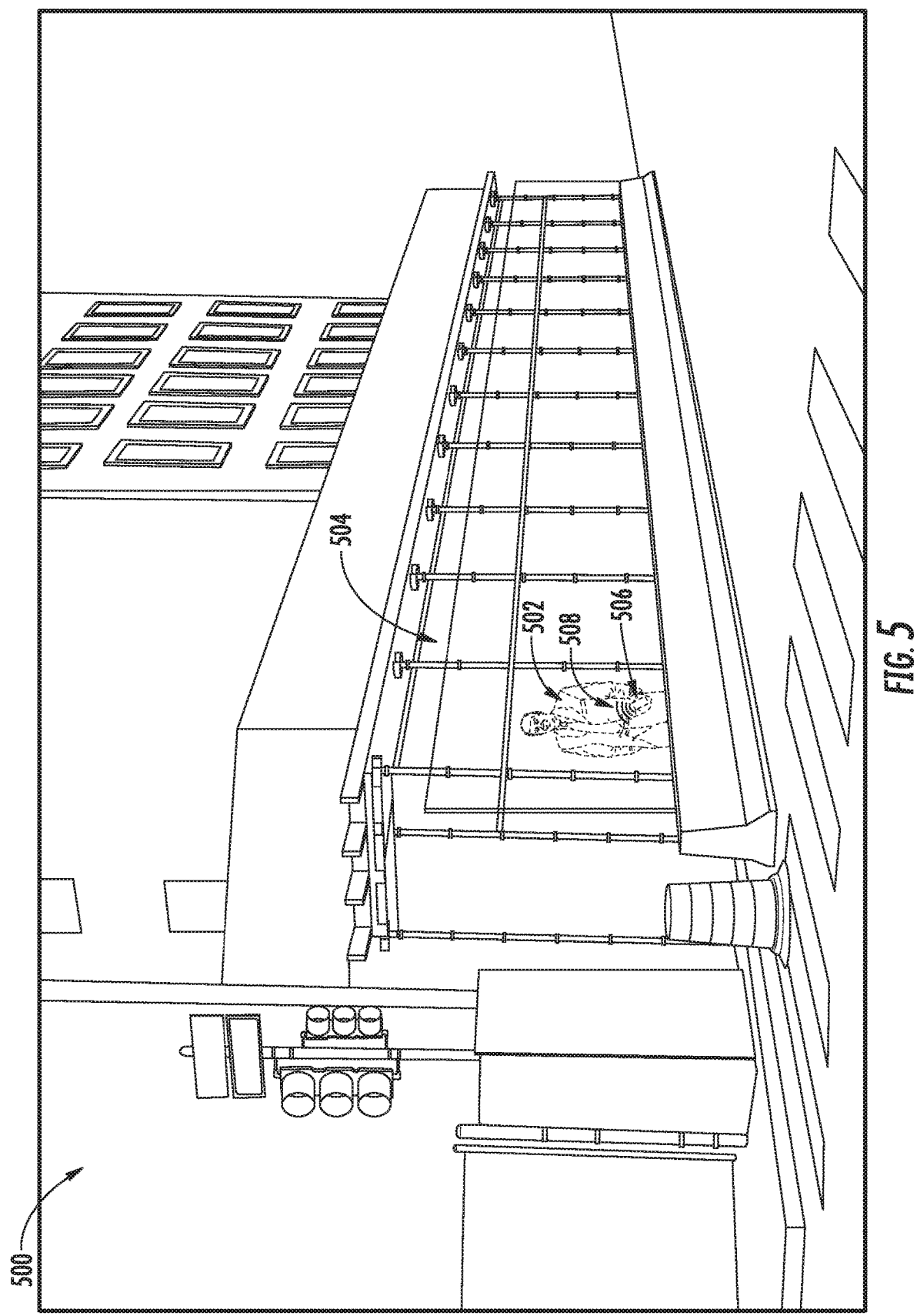
FIG. 5 depicts an example surrounding environment of a vehicle according to example embodiments of the present disclosure.

By way of example, FIG. 5 depicts an example surrounding environment 500 of a vehicle (not shown) according to example embodiments of the present disclosure. For the purposes of keeping pedestrian safety, the vehicle computing system 102 can recognize that there may be a pedestrian 502 is located proximate to the vehicle 104 but blocked from the vehicle sensor's field of view, predict the motion of the pedestrian 502, and plan the vehicle's motion accordingly (e.g., to allow the pedestrian 502 to cross the street). By way of example, the vehicle computing system 102 (e.g., the perception system 124) may identify a large obstruction 504 (e.g., temporary protective construction wall) within the surrounding environment 500 of the vehicle 104 (e.g., on a sidewalk). There may also be a pedestrian 502 located behind the obstruction 504 (e.g., walking on the sidewalk behind the wall). The obstruction 504 may prevent the vehicle's sensors 112 from visualizing the pedestrian 504 (e.g., occluding a sensor field of view). To overcome this, the vehicle computing system 102 can identify location data (e.g., location, heading, etc.) of a user device 506 of the pedestrian based as least in part on an identifier associated with the user device 506 (e.g., if known) and/or one or more signals 508 from the user device 506, as described herein. Moreover, the vehicle computing system 102 can determine that a change in user device location (e.g., over time) may be indicative of a particular type of moving object, such as a walking pedestrian. Accordingly, the vehicle computing system 102 can perceive the pedestrian 502 and adjust the vehicle's motion to account for the pedestrian 502 (e.g., decelerate, stop for the pedestrian 502, nudge away from the pedestrian 502, etc.).

In another example, the vehicle computing system 102 can utilize identifiers to navigate through an area such as, for example, a service depot, the interior of a structure (e.g., enclosed and/or open-air), and/or other type of area. For instance, the vehicle computing system 102 can obtain data indicative of one or more identifiers associated with one or more devices associated with the area (e.g., service depot). Such devices can include, for example, a user device associated with a maintenance system, cleaning system, robotic arm, and/or other service depot equipment. The devices can emit signals indicative of the identifier associated with that device. The vehicle computing system 102 can determine location data associated with the one or more devices of the area (e.g., service depot) based at least in part on the one or more identifiers associated with the one or more devices associated with area and the one or more signals emitted from these devices. The vehicle computing system 102 can determine a motion plan for the vehicle 104 based at least in part on the location data. In a manner similar to that described herein, the vehicle computing system 102 can cause the vehicle 104 to travel in accordance with the motion plan (e.g., to arrive at one or more of or each of the maintenance systems in a service depot).

A similar type of approach can be utilized for determining a refined location of a loading dock and/or other type of destination. For example, a user device need not be associated with a user. A user device can be associated with a location (e.g., loading dock, other destination, etc.). The vehicle computing system can perform the operations and functions described herein to determine a refined location of such user device positioned at the location based at least in part on an identifier associated with that user device and/or signals emitted from that user device that are indicative of the identifier.

Figure 6:
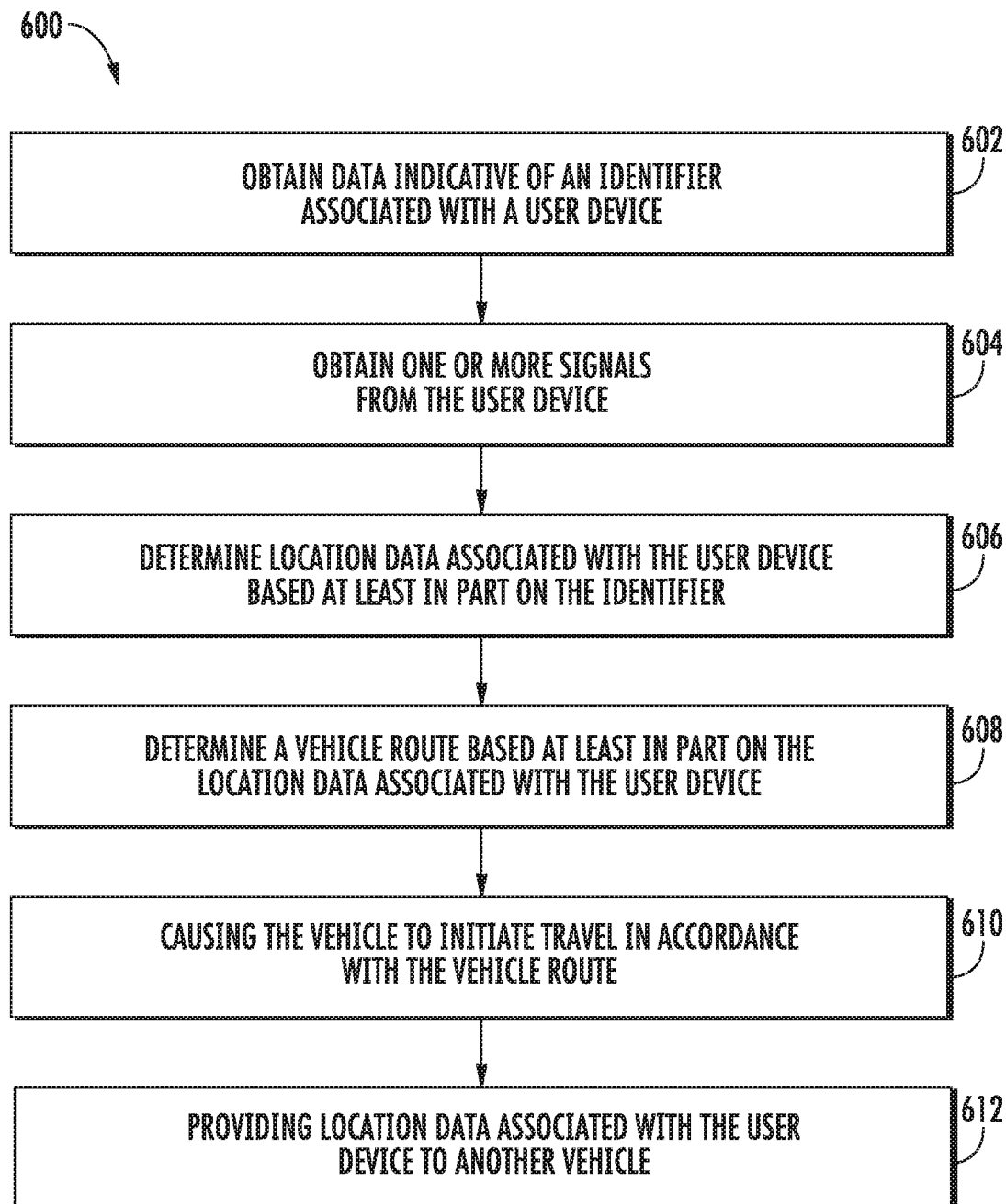
FIG. 6 depicts a flow diagram of an example method of controlling autonomous vehicles according to example embodiments of the present disclosure.

FIG. 6 depicts a flow diagram of an example method 600 of controlling autonomous vehicles according to example embodiments of the present disclosure. One or more portion(s) of the method 600 can be implemented by one or more computing devices such as, for example, the one or more computing device(s) of the vehicle computing system 102 and/or other systems. Each respective portion of the method 600 can be performed by any (or any combination) of the one or more computing devices. Moreover, one or more portion(s) of the method 600 can be implemented as an algorithm on the hardware components of the device(s) described herein (e.g., as in FIGS. 1 and 8), for example, to control an autonomous vehicle. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (602), the method 600 can include obtaining data indicative of an identifier associated with a user device. For instance, the vehicle computing system 102 (e.g., onboard the vehicle 104) can obtain data indicative of an identifier 202 associated with a user device 138 of a user 110. The identifier 202 can include a temporary identifier associated with the user device 138. Such a temporary identifier can assigned to the user device 138 by a telecommunications network (e.g., via a network device). For example, the user device 138 can acquire the temporary identifier via a software application 206 downloaded to the user device 138. The user device 138 can provide data indicative of a service request 140 for a vehicle service to a remote computing system (e.g., the operations computing system 106). The data indicative of the service request 140 can be indicative of the temporary identifier. The vehicle computing system 102 can obtain data indicative of the temporary identifier from the remote computing system (e.g., the operations computing system 106).

At (604), the method 600 can include obtaining one or more signals from the user device 138. For instance, the vehicle computing system 102 can obtain one or more signals 304 emitted by the user device 138. The one or more signals 304 can be indicative of the identifier 202 associated with the user device 138. For example, the vehicle computing system 102 can be within a threshold distance 306 from the user device 138. The vehicle computing system 102 can scan for and/or receive the one or more signals 304 emitted by the user device 138 when the vehicle 104 is within the threshold distance 306.

At (606), the method 600 can include determining location data associated with the user device based at least in part on the identifier. The vehicle computing system 102 can determine location data 142 associated with the user device 138 based at least in part on the identifier 202 associated with the user device 138. For example, the vehicle computing system 102 can determine the location data 142 associated with the user device 138 based at least in part on a triangulation of the one or more signals 304 emitted by the user device 138. Determining the location data 142 can include, for example, the vehicle computing system 102 determining a location of the user device 138, a heading of the user device 138, and/or a distance between the user device 138 and the vehicle 104 (and/or other information).

In some implementations, the vehicle computing system 102 can determine the location data 142 associated with the user device 138 by filtering the user device 138 from among a plurality of user devices 308. For instance, the vehicle computing system 102 can obtain a plurality of signals emitted from a plurality of user devices 308 located within a surrounding environment of the vehicle 104. Each of the plurality of signals can include an identifier 202 associated with the respective emitting user device. The vehicle computing system 102 can filter the plurality of signals to identify the user device 138 of a user 110 based at least in part on the identifier 202 associated with the user device 138, as described herein.

At (608), the method 600 can include determining a vehicle route based at least in part on the location data associated with the user device. For instance, the vehicle computing system 102 can determine a vehicle route based at least in part on the location data 142 associated with the user device 138. For instance, the location data 142 associated with the user device 138 can be indicative of a location 456 of the user device 138. The vehicle computing system 102 can determine an updated vehicle route 452 based on the location data 142 associated with the user device 138. The updated vehicle route 452 can lead to the location 456 of the user device 138 that is determined based at least in part on the identifier 202.

In some implementations, a remote computing system (e.g., the operations computing system 106) can determine the updated vehicle route 452. For example, the vehicle computing system 102 can provide the location data 142 associated with the user device 138 to a remote computing system. The remote computing system can determine the updated vehicle route 452 based at least in part on the location data 142 and provide data indicative of the updated vehicle route 452 to the vehicle computing system. The vehicle computing system 102 can obtain the vehicle route from the remote computing system. As described herein, the vehicle computing system 102 can cause the vehicle 104 to initiate travel in accordance with a vehicle route (e.g., the updated vehicle route 452), at (610).

In some implementations, at (612), the method 600 can include providing location data associated with the user device to another vehicle. For instance, another vehicle 310 may be more appropriate to provide the requested vehicle service to the user 110. The vehicle computing system 102 can provide the location data 142 associated with the user device 138 to at least one of a remote computing device that is remote from the vehicle 104 (e.g., the operations computing system 106) or another vehicle 310. The remote computing system and/or the other vehicle 310 can determine a vehicle route to the user 110 based on the location data 142 and cause the other vehicle 310 to travel accordingly (e.g., to pick up the user 110).

Figure 7:
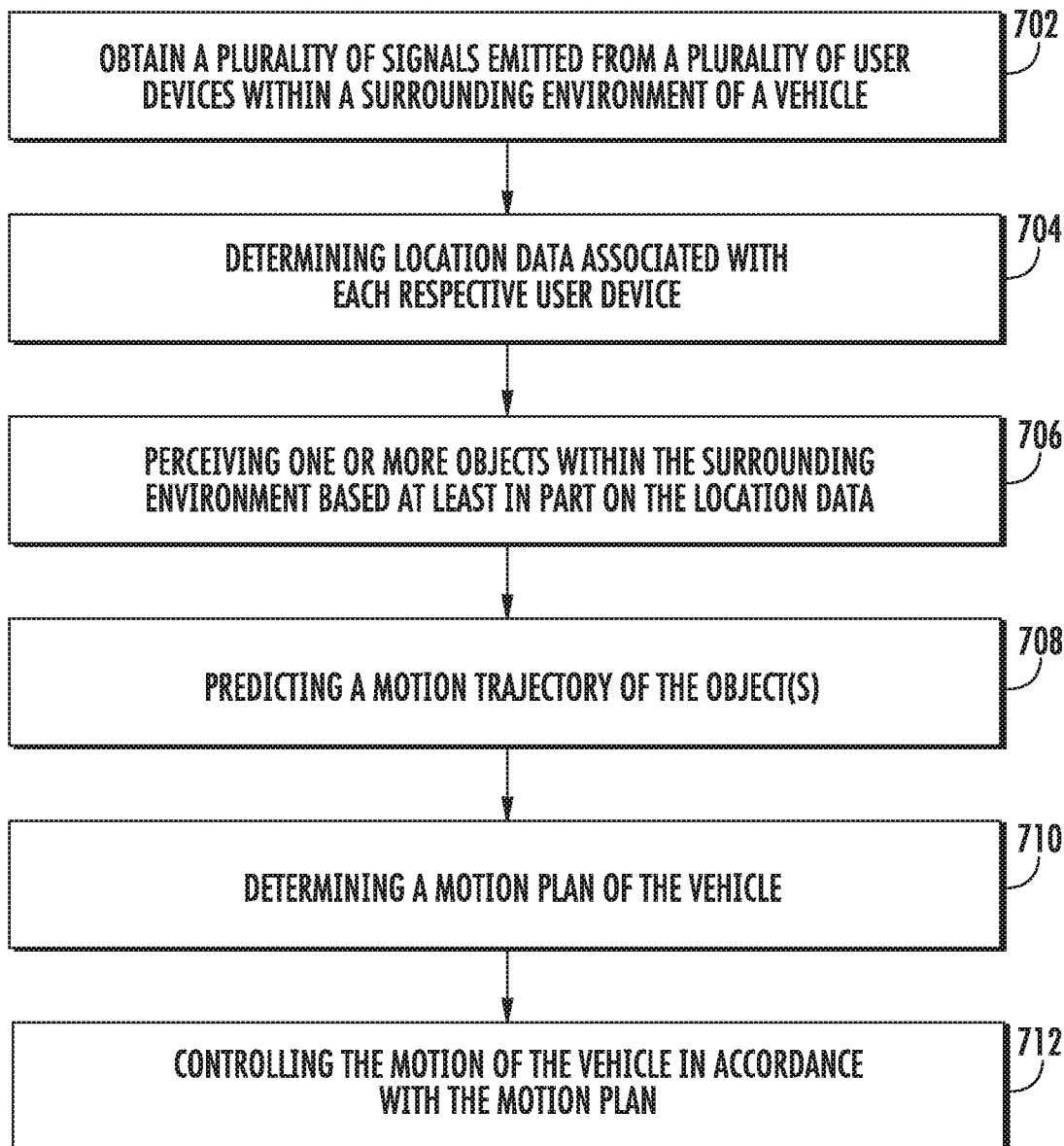
FIG. 7 depicts a flow diagram of another example method of controlling autonomous vehicles according to example embodiments of the present disclosure.

FIG. 7 depicts a flow diagram of another example method of controlling autonomous vehicles according to example embodiments of the present disclosure. One or more portion(s) of the method 700 can be implemented by one or more computing devices such as, for example, the one or more computing device(s) of the vehicle computing system 102 and/or other systems. Each respective portion of the method 700 can be performed by any (or any combination) of the one or more computing devices. Moreover, one or more portion(s) of the method 700 can be implemented as an algorithm on the hardware components of the device(s) described herein (e.g., as in FIGS. 1 and 8), for example, to control an autonomous vehicle. FIG. 7 depicts elements performed in a particular order for purposes of illustration and discussion and are not meant to be limiting.

At (702), the method 700 can include obtaining a plurality of signals emitted from a plurality of user devices within a surrounding environment of a vehicle. For instance, the vehicle computing system 102 can obtain a plurality of signals emitted from a plurality of user devices 308 located within a surrounding environment of the vehicle 104. Each of the plurality of signals can include an identifier associated with the respective emitting user device.

At (704), the method 700 can include determining location data associated with each respective user device. For instance, the vehicle computing system 102 can determine location data associated with each of the plurality of user devices within the surrounding environment of the vehicle 104 based at least in part on the identifier associated with the respective user device. Additionally, or alternatively, in the event that the identifier of a user device is not known, the vehicle computing system 102 can determine location data associated with a user device by triangulating the signal(s) emitted from that user device.

At (706), the method 700 can include perceiving one or more objects within the surrounding environment based at least in part on the location data. The vehicle computing system 102 (e.g., the perception system 124) can perceive one or more objects within the surrounding environment of the vehicle 104 based at least in part on the location data associated with one or more of the plurality of user devices. In some implementations, the location data can be the sole basis for perceiving such object(s). In some implementations, the location data can be one of a plurality of inputs used to perceive such object(s).

At (708), the method 700 can include predicting a motion trajectory of the object(s). For instance, the vehicle computing system 102 can predict a trajectory of the one or more objects perceived within the surrounding environment of the vehicle 104 (e.g., based at least in part on the location data). Moreover, the vehicle computing system 102 can determined a motion plan 134 for the vehicle 104 with respect to these object(s) and the predicted trajectories of the object(s), at (710). The vehicle computing system 102 can control the motion of the vehicle 104 in accordance with the motion plan 134, as described herein, at (712).

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include the vehicle computing system 102 of the vehicle 104 and the operations computing system 106 that can be communicatively coupled to one another over one or more network(s) 810.

The computing device(s) 801 of the vehicle computing system 102 can include processor(s) 802 and a memory 804. The one or more processors 802 can be any suitable processing device (e.g., a processor core, a microprocessor, an ASIC, a FPGA, a controller, a microcontroller, etc.) and can be one processor or a plurality of processors that are operatively connected. The memory 804 can include one or more non-transitory computer-readable storage media, such as RAM, ROM, EEPROM, EPROM, one or more memory devices, flash memory devices, data registrar, etc., and combinations thereof.

The memory 804 can store information that can be accessed by the one or more processors 802. For instance, the memory 804 (e.g., one or more non-transitory computer-readable storage mediums, memory devices) on-board the vehicle 104 can include computer-readable instructions 806 that can be executed by the one or more processors 802. The instructions 806 can be software written in any suitable programming language or can be implemented in hardware. Additionally, or alternatively, the instructions 806 can be executed in logically and/or virtually separate threads on processor(s) 802.

For example, the memory 804 on-board the vehicle 104 can store instructions 806 that when executed by the one or more processors 802 on-board the vehicle 104 cause the one or more processors 802 (the vehicle computing system 102) to perform operations such as any of the operations and functions of the vehicle computing system 102, the operations and functions for controlling an autonomous vehicle (e.g., one or more portions of methods 600 and/or 700), any of the operations and functions for which the vehicle computing system 102 is configured, and/or any other operations and functions of the vehicle computing system 102, as described herein.

The memory 804 can store data 808 that can be obtained, received, accessed, written, manipulated, created, and/or stored. The data 808 can include, for instance, data indicative of an identifier, data indicative of a service request, data indicative of a location associated with a user, other data associated with a user device and/or user, state data, prediction data, motion planning data, data associated with a vehicle route/updated vehicle route, and/or other data/information as described herein. In some implementations, the computing device(s) 801 can obtain data from one or more memories that are remote from the vehicle 104.

The computing device(s) 801 can also include a communication interface 809 used to communicate with one or more other system(s) on-board the vehicle 104 and/or a remote computing device that is remote from the vehicle 104 (e.g., of the operations computing system 106). The communication interface 809 can include any circuits, components, software, etc. for communicating via one or more networks (e.g., network(s) 810). In some implementations, the communication interface 809 can include, for example, one or more of a communications controller, receiver, transceiver, transmitter, port, conductors, software and/or hardware for communicating data.

The operations computing system 106 can include one or more computing device(s) 821 that are remote from the vehicle computing system 102. The computing device(s) 821 can include one or more processors 822 and a memory 824. The one or more processors 822 can be any suitable processing device (e.g., a processor core, a microprocessor, an ASIC, a FPGA, a controller, a microcontroller, etc.) and can be one processor or a plurality of processors that are operatively connected. The memory 824 can include one or more tangible, non-transitory computer-readable storage media, such as RAM, ROM, EEPROM, EPROM, one or more memory devices, flash memory devices, data registrar, etc., and combinations thereof.

The memory 824 can store information that can be accessed by the one or more processors 822. For instance, the memory 824 (e.g., one or more tangible, non-transitory computer-readable storage media, one or more memory devices, etc.) can include computer-readable instructions 826 that can be executed by the one or more processors 822. The instructions 826 can be software written in any suitable programming language or can be implemented in hardware. Additionally, or alternatively, the instructions 826 can be executed in logically and/or virtually separate threads on processor(s) 822.

For example, the memory 824 can store instructions 826 that when executed by the one or more processors 822 cause the one or more processors 822 to perform operations such as any of the operations and functions of the operations computing system 106 or for which the operations computing system 106 is configured, as described herein, and/or any other operations and functions described herein.

The memory 824 can store data 828 that can be obtained, received, accessed, written, manipulated, created, and/or stored. The data 828 can include, for instance, data indicative of an identifier, data indicative of a service request, data indicative of a location associated with a user, other data associated with a user device and/or user, data indicative of a vehicle route/updated vehicle route, data associated with one or more vehicles, and/or other data/information as described herein. In some implementations, the computing device(s) 821 can obtain data from one or more memories that are remote from the operations computing system 106 and/or are onboard the vehicle 104.

The computing device(s) 821 can also include a communication interface 829 used to communicate with one or more system(s) onboard the vehicle 104 and/or another computing device that is remote from the operations computing system 106. The communication interface 829 can include any circuits, components, software, etc. for communicating via one or more networks (e.g., network(s) 810). In some implementations, the communication interface 829 can include, for example, one or more of a communications controller, receiver, transceiver, transmitter, port, conductors, software and/or hardware for communicating data.

The network(s) 810 can be any type of network or combination of networks that allows for communication between devices. In some embodiments, the network(s) 810 can include one or more of a local area network, wide area network, the Internet, secure network, cellular network, mesh network, peer-to-peer communication link and/or some combination thereof and can include any number of wired or wireless links. Communication over the network(s) 810 can be accomplished, for instance, via a communication interface using any type of protocol, protection scheme, encoding, format, packaging, etc.

The user device 138 can be various types of user devices, such as, a phone, a smart phone, a tablet, a navigation system, a personal digital assistant (PDA), a laptop computer, a desktop computer, a computerized watch (e.g., a smart watch), computerized eyewear, computerized headwear, other types of wearable computing devices, a gaming system, a media player, an e-book reader, an embedded computing device, signal emitting device (e.g., beacon) attached to another device, and/or any other type of mobile and/or non-mobile computing device. The user device can also include a device configured to emit a signal (e.g., a device associated with an item). In some implementations, the user device 138 can be located (temporarily or permanently) in a vehicle (e.g., an automobile). The user device 138 can include various components for performing various operations and functions as described herein. For instance, the user device 138 can include one or more processor(s) and one or more memory device(s). The user device 138 can include a display device (e.g., screen, touchscreen, etc.) configured to display a user interface for a user. In some implementations, the user can provide user input to the user device 138 (e.g., via the user interface), as described herein. The user device 138 can also include a communication interface that allows the user device 138 to emitted signals and/or communicate with other systems. The communication interface can include, for example, one or more of a communications controller, receiver, transceiver, transmitter, port, conductors, software and/or hardware for communicating data.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of controlling autonomous vehicles, comprising:
    obtaining, by a computing system that comprises one or more computing devices onboard an autonomous vehicle, data indicative of an identifier associated with a user device of a user, wherein the identifier is assigned to the user device by a cellular network;
    determining, by the computing system, location data associated with the user device based at least in part on the identifier associated with the user device, wherein the location data is indicative of a location of the user device;
    determining, by the computing system, a vehicle route based at least in part on the location data associated with the user device;
    causing, by the computing system, the autonomous vehicle to initiate travel in accordance with the vehicle route; and
    causing, by the computing system, the autonomous vehicle to perform a stopping action proximate to the location of the user device.

2. The computer-implemented method of claim 1, wherein determining the location data associated with the user device based at least in part on the identifier associated with the user device comprises:
    obtaining, by the computing system, one or more signals emitted by the user device, wherein the one or more signals are indicative of the identifier associated with the user device; and
    determining, by the computing system, the location data associated with the user device based at least in part on a triangulation of the one or more signals emitted by the user device.

3. The computer-implemented method of claim 2, wherein the autonomous vehicle is within a threshold distance from the user device.

4. The computer-implemented method of claim 1, wherein the identifier comprises a temporary identifier associated with the user device.

5. The computer-implemented method of claim 4, wherein the user device acquires the temporary identifier via a software application downloaded to the user device, wherein the user device provides data indicative of a service request for a vehicle service to a remote computing system, and wherein the data indicative of the service request is indicative of the temporary identifier.

6. The computer-implemented method of claim 5, wherein obtaining the data indicative of the identifier associated with the user device of the user comprises:
    obtaining, by the computing system, data indicative of the temporary identifier from the remote computing system.

7. The computer implemented method of claim 1, wherein determining the location data associated with the user device based at least in part on the identifier associated with the user device of the user comprises:

determining, by the computing system, a location of the user device, a heading of the user device, and a distance between the user device and the autonomous vehicle.

8. The computer-implemented method of claim 1, wherein determining the location data associated with the user device based at least in part on the identifier associated with the user device comprises:

obtaining, by the computing system, a plurality of signals emitted from a plurality of user devices located within a surrounding environment of the autonomous vehicle, wherein each of the plurality of signals comprises an identifier associated with the respective emitting user device; and filtering, by the computing system, the plurality of signals to identify the user device of the user based at least in part on the identifier associated with the user device.

9. The computer-implemented method of claim 1, wherein the location data associated with the user device is indicative of a location of the user device, and wherein determining the vehicle route based at least in part on the location data associated with the user device comprises:

determining, by the computing system, an updated vehicle route based on the location data associated with the user device, wherein the updated vehicle route leads to the location of the user device that is determined based at least in part on the identifier.

10. The computer-implemented method of claim 1, wherein determining the vehicle route based at least in part on the location data associated with the user device comprises:

providing, by the computing system, the location data associated with the user device to a remote computing system; and obtaining, by the computing system, the vehicle route from the remote computing system.

11. A computing system for controlling autonomous vehicles, comprising:

one or more processors; and one or more memory devices, the one or more memory devices storing instructions that when executed by the one or more processors cause the computing system to perform operations, the operations comprising:

obtaining data indicative of a service request for a vehicle service for a user, wherein the data indicative of the service request comprises data indicative of an identifier associated with a user device, wherein the identifier is assigned to the user device by a cellular network;

determining location data associated with the user device based at least in part on the identifier associated with the user device, wherein the location data is indicative of a location of the user device;

determining an updated vehicle route based at least in part on the location data associated with the user device;

causing the autonomous vehicle to initiate travel in accordance with the updated vehicle route; and causing the autonomous vehicle to perform a stopping action proximate to the location of the user device.

12. The computing system of claim 11, wherein the identifier comprises a radio network temporary identifier assigned to the user device.

13. The computing system of claim 11, wherein the autonomous vehicle is travelling in accordance with an initial vehicle route, and wherein causing the autonomous vehicle to travel in accordance with the updated vehicle route comprises:

causing the autonomous vehicle to adjust a motion of the autonomous vehicle from travelling in accordance with the initial vehicle route to travelling in accordance with the updated vehicle route.

14. The computing system of claim 11, wherein determining the location data associated with the user device based at least in part on the identifier associated with the user device of the user comprises:

obtaining one or more signals emitted by the user device, wherein the one or more signals are indicative of the identifier associated with the user device, and wherein the user device is located within a surrounding environment of the autonomous vehicle; and determining the location data associated with the user device based at least in part on a triangulation of the one or more signals emitted by the user device.

15. The computing system of claim 11, wherein the operations further comprise:

obtaining a plurality of signals emitted from a plurality of user devices located within a surrounding environment of the autonomous vehicle, wherein each of the plurality of signals comprises an identifier associated with the respective emitting user device;

determining location data associated with each of the plurality of user devices within the surrounding environment of the autonomous vehicle based at least in part on the identifier associated with the respective user device; and perceiving one or more objects within the surrounding environment of the autonomous vehicle based at least in part on the location data associated with one or more of the plurality of user devices.

16. An autonomous vehicle comprising:

a communications system comprising one or more antennas;

one or more processors; and one or more memory devices, the one or more memory devices storing instructions that when executed by the one or more processors cause the autonomous vehicle to perform operations, the operations comprising:

obtaining data indicative of an identifier associated with a user device, wherein the identifier is assigned to the user device by a cellular network;

obtaining, via the communications system, one or more signals emitted by the user device;

determining location data associated with the user device based at least in part on the identifier associated with the user device and the one or more signals emitted by the user device, wherein the location data is indicative of a location of the user device; and causing the autonomous vehicle to perform a stopping action proximate to the location of the user device.

17. The autonomous vehicle of claim 16, wherein the operations further comprise:

determining a vehicle route based at least in part on the location data associated with the user device; and causing the autonomous vehicle to initiate travel in accordance with the vehicle route.

18. The autonomous vehicle of claim 16, wherein the operations further comprise:

providing the location data associated with the user device to at least one of a remote computing device that is remote from the autonomous vehicle or another autonomous vehicle.

19. The autonomous vehicle of claim 16, wherein the one or more signals emitted by the user device are indicative of the identifier associated with the user device, and wherein determining the location data associated with the user device based at least in part on the identifier associated with the user device and the one or more signals emitted by the user device comprises:
identifying the one or more signals as being emitted from the user device based at least in part on the identifier;
performing a triangulation of the one or more signals emitted from the user device; and
determining the location data associated with the user device based at least in part on the triangulation of the one or more signals emitted from the user device.

20. A computer-implemented method of controlling autonomous vehicles, comprising:
obtaining, by a computing system that comprises one or more computing devices onboard an autonomous vehicle, data indicative of an identifier associated with a user device of a user, wherein the identifier is assigned to the user device by a cellular network;
determining, by the computing system, location data associated with the user device based at least in part on the identifier associated with the user device, wherein determining the location data associated with the user device based at least in part on the identifier associated with the user device comprises
obtaining, by the computing system, one or more signals emitted by the user device, wherein the one or more signals are indicative of the identifier associated with the user device, and
determining, by the computing system, the location data associated with the user device based at least in part on a triangulation of the one or more signals emitted by the user device;
determining, by the computing system, a vehicle route based at least in part on the location data associated with the user device; and
causing, by the computing system, the autonomous vehicle to initiate travel in accordance with the vehicle route.

21. The computer-implemented method of claim 20, wherein the autonomous vehicle is within a threshold distance from the user device.

22. A computer-implemented method of controlling autonomous vehicles, comprising:
obtaining, by a computing system that comprises one or more computing devices onboard an autonomous vehicle, data indicative of an identifier associated with a user device of a user, wherein the identifier is assigned to the user device by a cellular network, and wherein the identifier comprises a temporary identifier associated with the user device;
determining, by the computing system, location data associated with the user device based at least in part on the identifier associated with the user device;
determining, by the computing system, a vehicle route based at least in part on the location data associated with the user device; and
causing, by the computing system, the autonomous vehicle to initiate travel in accordance with the vehicle route.

23. The computer-implemented method of claim 22, wherein the user device acquires the temporary identifier via a software application downloaded to the user device, wherein the user device provides data indicative of a service request for a vehicle service to a remote computing system, and wherein the data indicative of the service request is indicative of the temporary identifier.

24. The computer-implemented method of claim 23, wherein obtaining the data indicative of the identifier associated with the user device of the user comprises:
obtaining, by the computing system, data indicative of the temporary identifier from the remote computing system.

25. A computer-implemented method of controlling autonomous vehicles, comprising:
obtaining, by a computing system that comprises one or more computing devices onboard an autonomous vehicle, data indicative of an identifier associated with a user device of a user, wherein the identifier is assigned to the user device by a cellular network;
determining, by the computing system, location data associated with the user device based at least in part on the identifier associated with the user device, wherein determining the location data associated with the user device based at least in part on the identifier associated with the user device of the user comprises determining, by the computing system, a location of the user device, a heading of the user device, and a distance between the user device and the autonomous vehicle;
determining, by the computing system, a vehicle route based at least in part on the location data associated with the user device; and
causing, by the computing system, the autonomous vehicle to initiate travel in accordance with the vehicle route.

26. A computer-implemented method of controlling autonomous vehicles, comprising:
obtaining, by a computing system that comprises one or more computing devices onboard an autonomous vehicle, data indicative of an identifier associated with a user device of a user, wherein the identifier is assigned to the user device by a cellular network;
determining, by the computing system, location data associated with the user device based at least in part on the identifier associated with the user device, wherein determining the location data associated with the user device based at least in part on the identifier associated with the user device comprises
obtaining, by the computing system, a plurality of signals emitted from a plurality of user devices located within a surrounding environment of the autonomous vehicle, wherein each of the plurality of signals comprises an identifier associated with the respective emitting user device, and
filtering, by the computing system, the plurality of signals to identify the user device of the user based at least in part on the identifier associated with the user device;
determining, by the computing system, a vehicle route based at least in part on the location data associated with the user device; and
causing, by the computing system, the autonomous vehicle to initiate travel in accordance with the vehicle route.

27. A computer-implemented method of controlling autonomous vehicles, comprising:
obtaining, by a computing system that comprises one or more computing devices onboard an autonomous vehicle, data indicative of an identifier associated with a user device of a user, wherein the identifier is assigned to the user device by a cellular network;

determining, by the computing system, location data associated with the user device based at least in part on the identifier associated with the user device, wherein the location data associated with the user device is indicative of a location of the user device;

determining, by the computing system, a vehicle route based at least in part on the location data associated with the user device, wherein determining the vehicle route based at least in part on the location data associated with the user device comprises determining, by the computing system, an updated vehicle route based on the location data associated with the user device, wherein the updated vehicle route leads to the location of the user device that is determined based at least in part on the identifier; and causing, by the computing system, the autonomous vehicle to initiate travel in accordance with the updated vehicle route.

28. A computer-implemented method of controlling autonomous vehicles, comprising:

obtaining, by a computing system that comprises one or more computing devices onboard an autonomous vehicle, data indicative of an identifier associated with a user device of a user, wherein the identifier is assigned to the user device by a cellular network;

determining, by the computing system, location data associated with the user device based at least in part on the identifier associated with the user device;

providing, by the computing system, the location data associated with the user device to a remote computing system;

obtaining, by the computing system, a vehicle route from the remote computing system; and causing, by the computing system, the autonomous vehicle to initiate travel in accordance with the vehicle route.

29. A computing system for controlling autonomous vehicles, comprising:

one or more processors; and one or more memory devices, the one or more memory devices storing instructions that when executed by the one or more processors cause the computing system to perform operations, the operations comprising:

obtaining data indicative of a service request for a vehicle service for a user, wherein the data indicative of the service request comprises data indicative of an identifier associated with a user device, wherein the identifier is assigned to the user device by a cellular network, and wherein the identifier comprises a radio network temporary identifier assigned to the user device;

determining location data associated with the user device based at least in part on the identifier associated with the user device;

determining an updated vehicle route based at least in part on the location data associated with the user device; and causing the autonomous vehicle to initiate travel in accordance with the updated vehicle route.

30. A computing system for controlling autonomous vehicles, comprising:

one or more processors; and one or more memory devices, the one or more memory devices storing instructions that when executed by the one or more processors cause the computing system to perform operations, the operations comprising:

obtaining data indicative of a service request for a vehicle service for a user, wherein the data indicative of the service request comprises data indicative of an identifier associated with a user device, wherein the identifier is assigned to the user device by a cellular network;

determining location data associated with the user device based at least in part on the identifier associated with the user device, wherein the autonomous vehicle is travelling in accordance with an initial vehicle route;

determining an updated vehicle route based at least in part on the location data associated with the user device; and causing the autonomous vehicle to adjust a motion of the autonomous vehicle from travelling in accordance with the initial vehicle route to travelling in accordance with the updated vehicle route.

31. A computing system for controlling autonomous vehicles, comprising:

one or more processors; and one or more memory devices, the one or more memory devices storing instructions that when executed by the one or more processors cause the computing system to perform operations, the operations comprising:

obtaining data indicative of a service request for a vehicle service for a user, wherein the data indicative of the service request comprises data indicative of an identifier associated with a user device, wherein the identifier is assigned to the user device by a cellular network;

determining location data associated with the user device based at least in part on the identifier associated with the user device, wherein determining the location data associated with the user device based at least in part on the identifier associated with the user device of the user comprises obtaining one or more signals emitted by the user device, wherein the one or more signals are indicative of the identifier associated with the user device, and wherein the user device is located within a surrounding environment of the autonomous vehicle, and determining the location data associated with the user device based at least in part on a triangulation of the one or more signals emitted by the user device;

determining an updated vehicle route based at least in part on the location data associated with the user device; and causing the autonomous vehicle to initiate travel in accordance with the updated vehicle route.

32. A computing system for controlling autonomous vehicles, comprising:

one or more processors; and one or more memory devices, the one or more memory devices storing instructions that when executed by the one or more processors cause the computing system to perform operations, the operations comprising:

obtaining data indicative of a service request for a vehicle service for a user, wherein the data indicative of the service request comprises data indicative of an identifier associated with a user device, wherein the identifier is assigned to the user device by a cellular network;

determining location data associated with the user device based at least in part on the identifier associated with the user device;

determining an updated vehicle route based at least in part on the location data associated with the user device;

causing the autonomous vehicle to initiate travel in accordance with the updated vehicle route;

obtaining a plurality of signals emitted from a plurality of user devices located within a surrounding environment of the autonomous vehicle, wherein each of the plurality of signals comprises an identifier associated with the respective emitting user device;

determining location data associated with each of the plurality of user devices within the surrounding environment of the autonomous vehicle based at least in part on the identifier associated with the respective user device; and perceiving one or more objects within the surrounding environment of the autonomous vehicle based at least in part on the location data associated with one or more of the plurality of user devices.

* * * * *